United States Patent
Choi et al.

(10) Patent No.: US 8,329,841 B2
(45) Date of Patent: Dec. 11, 2012

(54) PHOTOREACTIVE POLYMER AND METHOD FOR PREPARING THE SAME

(75) Inventors: Dai-Seung Choi, Daejeon (KR);
Hye-Young Jung, Daejeon (KR);
Sung-Ho Chun, Daejeon (KR); Heon Kim, Daejeon (KR); Sung-Don Hong, Daejeon (KR); Dong-Woo Yoo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/327,022

(22) Filed: Dec. 15, 2011

(65) Prior Publication Data

US 2012/0149848 A1    Jun. 14, 2012

Related U.S. Application Data

(62) Division of application No. 12/450,314, filed as application No. PCT/KR2008/001608 on Mar. 21, 2008, now abandoned.

(30) Foreign Application Priority Data

Mar. 22, 2007 (KR) .................. 10-2007-0028104
Mar. 22, 2007 (KR) .................. 10-2007-0028114

(51) Int. Cl.
*C08F 36/02* (2006.01)
*C08F 36/14* (2006.01)
*C08F 236/02* (2006.01)
*C08F 236/14* (2006.01)
*C07C 13/36* (2006.01)
*C07C 13/38* (2006.01)

(52) U.S. Cl. ........ 526/282; 526/283; 526/284; 526/256; 526/262; 526/332; 560/8

(58) Field of Classification Search ............... 526/282, 526/283, 284, 256, 262, 332; 560/8
See application file for complete search history.

(56) References Cited

U.S. PATENT DOCUMENTS

| | | |
|---|---|---|
| 5,464,669 A | 11/1995 | Kang et al. |
| 2002/0132880 A1 | 9/2002 | Choi et al. |
| 2004/0241319 A1 | 12/2004 | Sa et al. |
| 2006/0160970 A1 | 7/2006 | Kim et al. |

FOREIGN PATENT DOCUMENTS

| | | |
|---|---|---|
| JP | 62-226943 A | 10/1987 |
| JP | 11-505880 A | 5/1999 |
| JP | 11-181127 | 7/1999 |
| JP | 11-279266 A | 10/1999 |
| JP | 2004-505129 A | 2/2004 |
| JP | 2006-117862 A | 5/2006 |
| KR | 10-2004-0102862 | 12/2004 |
| KR | 10-2006-0029068 | 4/2006 |
| WO | WO 96/37526 A1 | 11/1996 |
| WO | WO 02/10231 A2 | 2/2002 |
| WO | WO 2006/073270 A1 | 7/2006 |
| WO | WO 2006/078129 A1 | 7/2006 |

OTHER PUBLICATIONS

Rehab, "Studies of Photoreactive Poly(Norbornene Derivatives) Bearing Chalcone Units", Journal of Macromolecular Science, Part A—Pure and Applied Chemistry, vol. A40, No. 7, 2003, pp. 689-703.
Schadt et al,, "Surface-Induced Parallel Alignment of Liquid Crystals by Linearly Polymerized Photopolymers", Jpn. J. Appl, Phys., vol. 31, 1992, pp. 2155-2164.
Dyaduysha et al., "Peculiarity of an Oblique Liquid Crystal Alignment Induced by a Photosensitive Orientant", Jpn. J. Appl. Phys., vol. 34, 1995, pp. L 1000-L 1002.

*Primary Examiner* — Caixia Lu
(74) *Attorney, Agent, or Firm* — McKenna Long & Aldridge LLP

(57) ABSTRACT

The present invention relates to a photoreactive polymer that comprises a multi-cyclic compound in a main chain, and a polymerization method thereof. Since the photoreactive polymer according to the present invention comprises a multi-cyclic compound having a high glass transition temperature as a main chain, the thermal stability is excellent, and since the mobility of the main chain is relatively high as compared to that of an additional polymer, a photoreactive group can be freely moved in the main chain of the polymer. Accordingly, it is possible to overcome a slow photoreactive rate that is considered a disadvantage of a polymer material used to prepare an alignment film for known liquid crystal display devices.

18 Claims, 1 Drawing Sheet

PHOTOREACTIVE POLYMER AND METHOD FOR PREPARING THE SAME

This application is a divisional application of U.S. patent application Ser. No. 12/450,314, filed on Sep. 21, 2009 now abandoned, which is a national stage application of International Application No. PCT/KR2008/001608, filed on Mar. 21, 2008, which claims priority to Korean Patent Application Nos. 10-2007-0028114, filed on Mar. 22, 2007, and 10-2007-0028104, filed on Mar. 22, 2007, all of which are hereby incorporated herein by reference for all purposes in their entirety.

TECHNICAL FIELD

The present invention relates to a photoreactive polymer, and more particularly to a photoreactive polymer that has an alignment property due to a photoreaction and includes a multi-cyclic compound in a main chain, thus having the excellent thermal stability and allowing the photoreaction to be rapid.

BACKGROUND ART

In recent years, a liquid crystal display that has a light weight and consumes a small amount of electric power has been used as a most competitive display that can be used instead of a cathode ray tube. In particular, since a thin film transistor liquid crystal display (TFT-LCD) that is driven by using a thin film transistor independently drives each of pixels, a response speed of the liquid crystal is very high, thus, a high-quality dynamic image can be realized. Accordingly, currently, the thin film transistor liquid crystal display is applied to a notebook computer, a wall-mounted television and the like, and the application range thereof is expanded.

During the production of a typical color thin film transistor-liquid crystal display, a thin film transistor driving device and an ITO transparent electrode are layered on a glass substrate, and an alignment film is then layered thereon to form a lower substrate of a cell. Spacers are formed by using a silant in order to inject a liquid crystal material between inner surfaces of a pair of upper and lower substrates, polarized films are provided on outer surfaces of the glass substrates, and the liquid crystal material is injected between a pair of substrates and cured to produce a liquid crystal display cell.

In the TFT-LCD, in order to use the liquid crystal as an optical switch, it is required that the liquid crystal is initially aligned on the layer on which the thin film transistor is formed at the innermost part of the display cell in a predetermined direction. In order to achieve this, a liquid crystal alignment film is used.

As a method of preparing the alignment film, a rubbing treatment method of unidirectionally rubbing a polymer resin film made of a polyimide or the like formed on a substrate by using clothes or a method of inclinedly depositing silicon dioxide ($SiO_2$) is known. In the case of the alignment film that is prepared by using the rubbing treatment method, there are problems in that the contamination is caused by the impurity that may be generated due to contact during the rubbing, the yield of the products is reduced due to the occurrence of static electricity, and contrast is reduced. In the case of the method of inclinedly depositing silicon dioxide, there are problems in that the preparing cost is increased and it is difficult to form the film having a large area, thus, the film is not suitable to be applied to a large liquid crystal display.

In order to solve this, an alignment method by a non-rubbing process using a photopolymerizable alignment material is developed to perform a photopolymerization by using the radiation of light so that the alignment of polymer is induced to align liquid crystals. A representative example of the non-rubbing process is an optical alignment using photo-polymerization that is announced by M. Schadt, et al. (Jpn. J. Appl. Phys., Vol 31, 1992, 2155), Dae S. Kang, et al. (U.S. Pat. No. 5,464,669), and Yuriy Reznikov (Jpn. J. Appl. Phys. Vol. 34, 1995, L1000). The optical alignment is a mechanism in which a photoreaction of a photosensitive group that is connected to the polymer occurs due to linearly polarized ultraviolet rays, and in this procedure, a main chain of the polymer is unidirectionally aligned, thereby aligning the liquid crystals.

The polycinnamate-based polymer such as PVCN (poly (vinyl cinnamate)) and PVMC (poly(vinyl methoxycinnamate)) has been mainly used as a representative material of the photopolymerizable alignment film. However, the poly-cinnamate-based polymer has a problem in that the optical alignment property of the polymer is excellent but the thermal stability is poor. That is, the thermal stability of the alignment film depends on the thermal stability of the polymer, and since the main chain of the polymer of polyvinyl cinnamate has a glass transition temperature of 100° C. or less, there is a problem in that the thermal stability of the alignment film is reduced.

Meanwhile, Japanese Unexamined Patent Application Publication No. 11-181127 discloses a method of producing a polymer type of alignment film that has a main chain such as acrylate and methacrylate and a side chain having a photo-sensitive group such as a cinnamate group, and an alignment film that is produced by using the method. However, the patent is disadvantageous in that since the mobility of the polymer is poor, even though the polymer is exposed to light for a long time, it is difficult to obtain the desired alignment property. The reason for this is that since the photosensitive group which is present in the polymer is restricted by the main chain of the polymer, the group is difficult to rapidly react with the radiated polarized light. Accordingly, since a long time is required to obtain a network polymer, a process efficiency is reduced, and if an alignment treatment process is finished after an insufficient time, since the alignment of the liquid crystals is insufficient in the prepared liquid crystal display, there are problems in that a dichroic ratio is low and contrast is reduced.

Korean Unexamined Patent Application Publication Nos. 2006-0029068 and 2004-0102862 disclose that polarized UV is radiated on a coated liquid crystal material without using a rubbing process to determine an alignment direction of liquid crystal. However, as described in the above patent, in the case of when the polarized UV is radiated on a curable liquid crystal material to align the liquid crystal, since the curing of the liquid crystal occurs in an alignment direction, the insufficient curing occurs, thus reducing the surface strength and easily causing the deformation due to external impact or heat.

Accordingly, a demand for a novel photoreactive polymer that has the excellent thermal stability and the improved surface strength and photoreaction rate is growing.

DISCLOSURE OF THE INVENTION

Technical Problem

The present invention has been made keeping in mind the above problems occurring in the related art, and it is an object of the present invention to provide a compound that has the excellent thermal stability and the improved photoreaction rate and is capable of being used as a monomer of the photoreactive polymer.

It is another object of the present invention to provide a photoreactive polymer that includes the compound.

It is still another object of the present invention to provide a method of preparing the photoreactive polymer.

Technical Solution

In order to accomplish the above objects, the present invention provides a multi-cyclic compound that includes a photoactive functional group in a main chain.

Additionally, the present invention provides a ring-opened hydrogenated polymer that includes the multi-cyclic compound as a monomer.

Additionally, the present invention provides a photoreactive polymer that includes a cycloolefin-noncycloolefin in a main chain.

Additionally, the present invention provides a method of preparing a ring-opened hydrogenated polymer that includes the multi-cyclic compound as a monomer. The method includes polymerizing the multi-cyclic compound in the presence of a catalyst mixture that includes a procatalyst including Group 4, Group 6, and Group 8 transition metals, a cocatalyst that provides a Lewis base capable of being weakly coordinate bonded to the metal of the procatalyst, and activators including neutral Group 15 and Group 16 elements that selectively improve the activity of the procatalyst metal at a temperature in the range of 10 to 200° C. while linear alkene, which is capable of controlling a size of a molecular weight, is added, and adding a catalyst that includes Group 4 or Group 8 to Group 10 transition metals to add hydrogen to a double bond remaining on a main chain.

Additionally, the present invention provides a method of preparing a polymer that includes a cycloolefin-noncycloolefin in a main chain. The method includes copolymerizing a cycloolefin monomer and a noncycloolefin monomer in conjunction with the noncyclic monomer by using a metallocene catalyst while a ring of the cyclic monomer is not opened. The copolymerizing is performed in the presence of a catalyst mixture that consists of a procatalyst including a metallocene catalyst and a cocatalyst including aluminoxane at a temperature in the range of 10 to 200° C. under polymerization pressure in the range of 1 to 60 bar.

Advantageous Effects

Since a photoreactive polymer according to the present invention includes a multi-cyclic compound having a high glass transition temperature as a main chain, the thermal stability is excellent, and since the mobility of the main chain is relatively high as compared to that of an additional polymer, a photoreactive group can be freely moved in the main chain of the polymer. Accordingly, it is possible to overcome a slow photoreactive rate that is considered a disadvantage of a polymer material used to prepare an alignment film for known liquid crystal display devices. In addition, in the case of the photoreactive polymer that includes the cycloolefin-noncycloolefin, the surface strength that cannot be improved by using the multi-cyclic compound can be improved by introducing the noncycloolefin compound into the main chain.

BEST MODE FOR CARRYING OUT THE INVENTION

Figure 1:
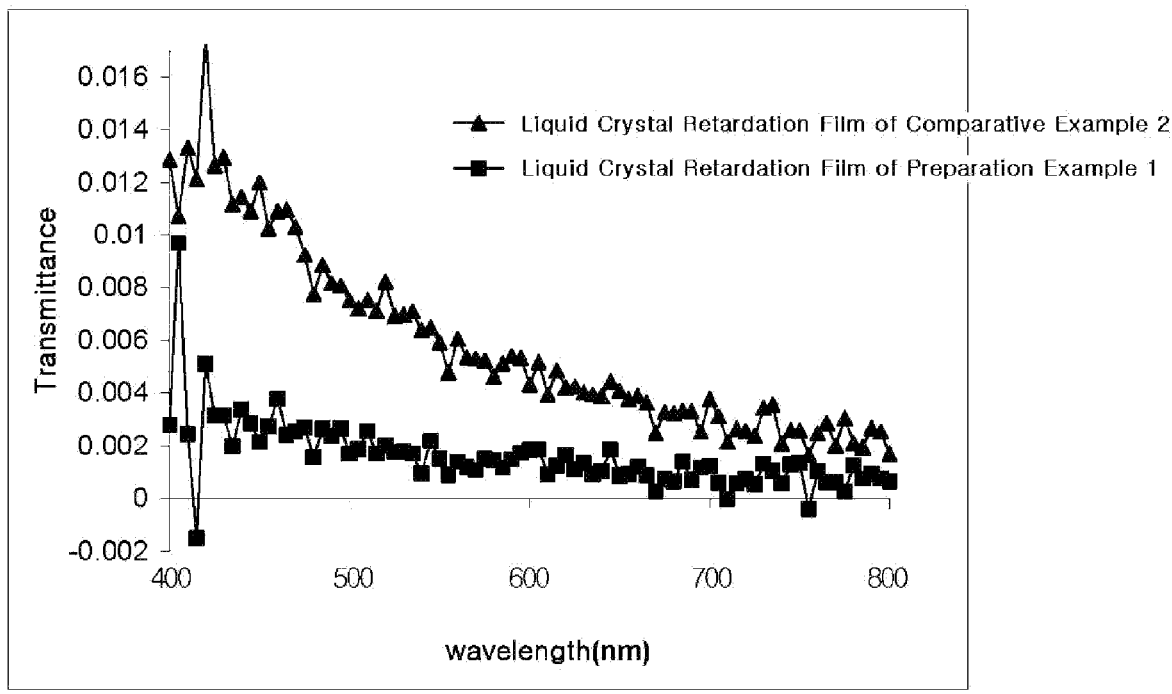
FIG. 1 is a graph that illustrates the measurement of light leakage of a liquid crystal retardation film that is prepared in Preparation Example 1 and Comparative Example 2.

Hereinafter, a detailed description will be given of the present invention.

A multi-cyclic compound having a photoactive functional group according to the present invention is a compound that is represented by the following Formula 1.

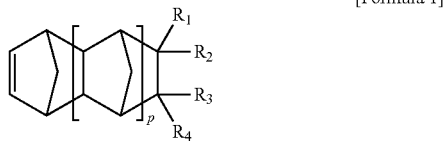

[Formula 1]

In the above Formula 1, P is an integer in the range of 0 to 4, and at least one of $R_1$, $R_2$, $R_3$, and $R_4$ is a radical that is selected from the group consisting of the following Formulae 1a, 1b, and 1c and the remains are each independently selected from the group consisting of hydrogen; halogen; substituted or unsubstituted C1-C20 alkyl; substituted or unsubstituted C2-C20 alkenyl; substituted or unsubstituted C5-C12 cycloalkyl; substituted or unsubstituted C6-C40 aryl; substituted or unsubstituted C7-C15 aralkyl; substituted or unsubstituted C2-C20 alkynyl; and a non-hydrocarbonaceous polar group that includes one or more elements selected from the group consisting of oxygen, nitrogen, phosphorus, sulfur, silicon, and boron, if $R_1$, $R_2$, $R_3$, and $R_4$ are not hydrogen, halogen, or a polar functional group, $R_1$ and $R_2$ or $R_3$ and $R_4$ may be bonded to each other to form a C1-C10 alkylidene group, or $R_1$ or $R_2$ may be bonded to any one of $R_3$ and $R_4$ to form a saturated or unsaturated C4-C12 ring or an aromatic ring having 6 to 24 carbon atoms, specific examples of the non-hydrocarbonaceous polar group include, but are not limited to —$OR_6$, —$R_5OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$ (p is an integer in the range of 1 to 10), —$(OR_5)_p$—$OR_6$ (p is an integer in the range of 1 to 10), —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —$N=C=S$, —NCO, —$R_5$—NCO, —CN, —$R_5CN$, —$NNC(=S)R_6$, —$R_5NNC(=S)R_6$, —$NO_2$, —$R_5NO_2$,

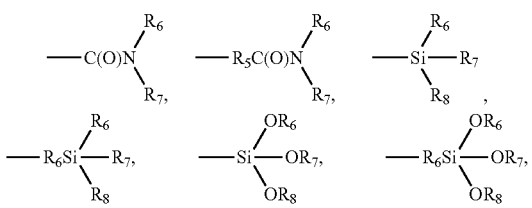

-continued
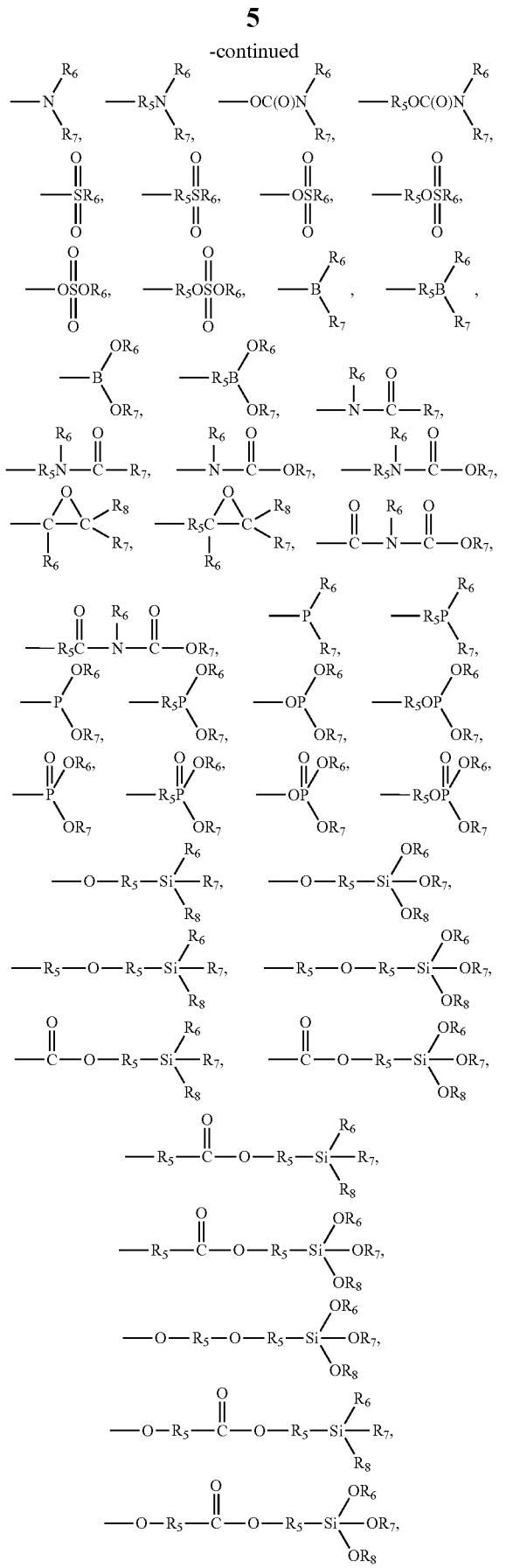
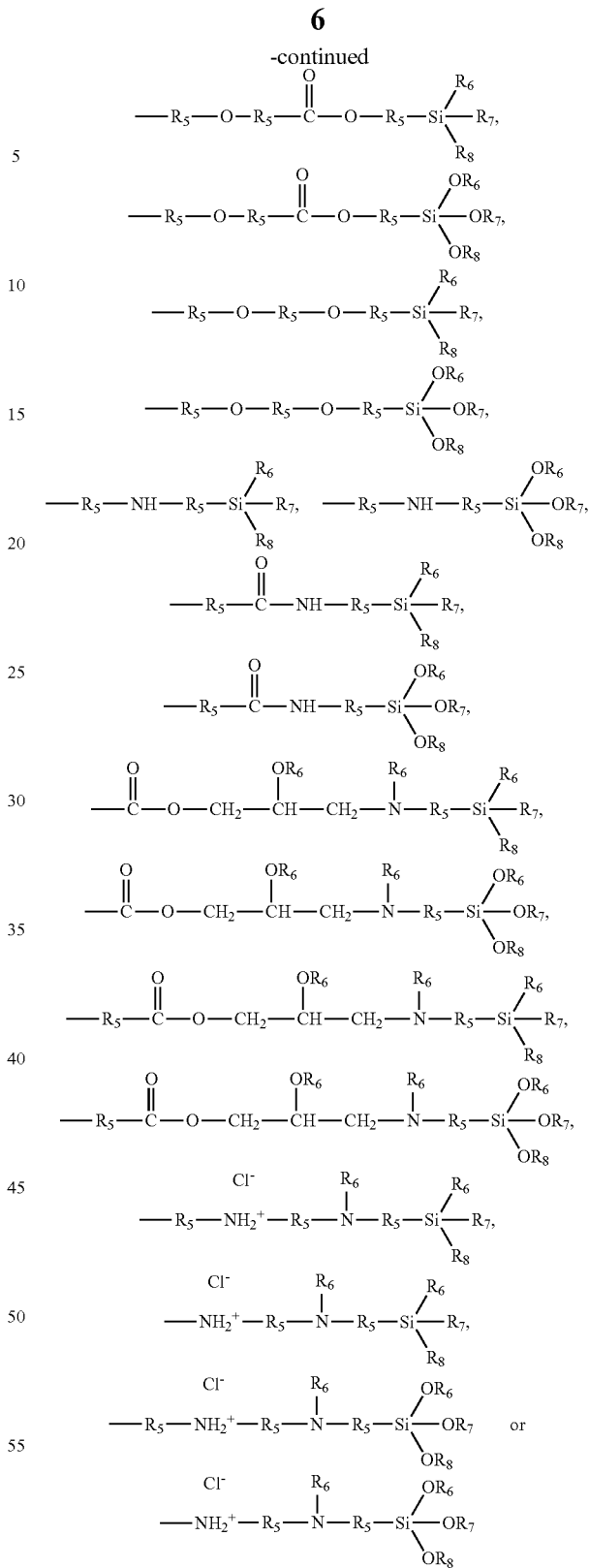
R$_5$ of each of the functional groups is substituted or unsubstituted C1-C20 alkylene; substituted or unsubstituted C2-C20 alkenylene; substituted or unsubstituted C5-C12 cycloalkylene; substituted or unsubstituted C6-C40 arylene; substituted or unsubstituted C7-C15 aralkylene; or substituted or unsubstituted C2-C20 alkynylene, and $R_6$, $R_7$ and $R_8$ are each independently hydrogen; halogen; substituted or unsubstituted C1-C20 alkyl; substituted or unsubstituted C2-C20 alkenyl; substituted or unsubstituted C5-C12 cycloalkyl; substituted or unsubstituted C6-C40 aryl; substituted or unsubstituted C7-C15 aralkyl; or substituted or unsubstituted C2-C20 alkynyl,

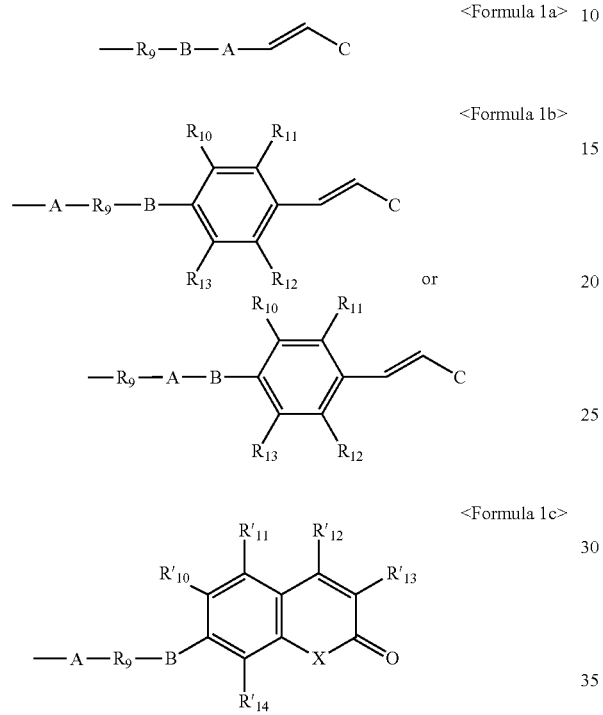

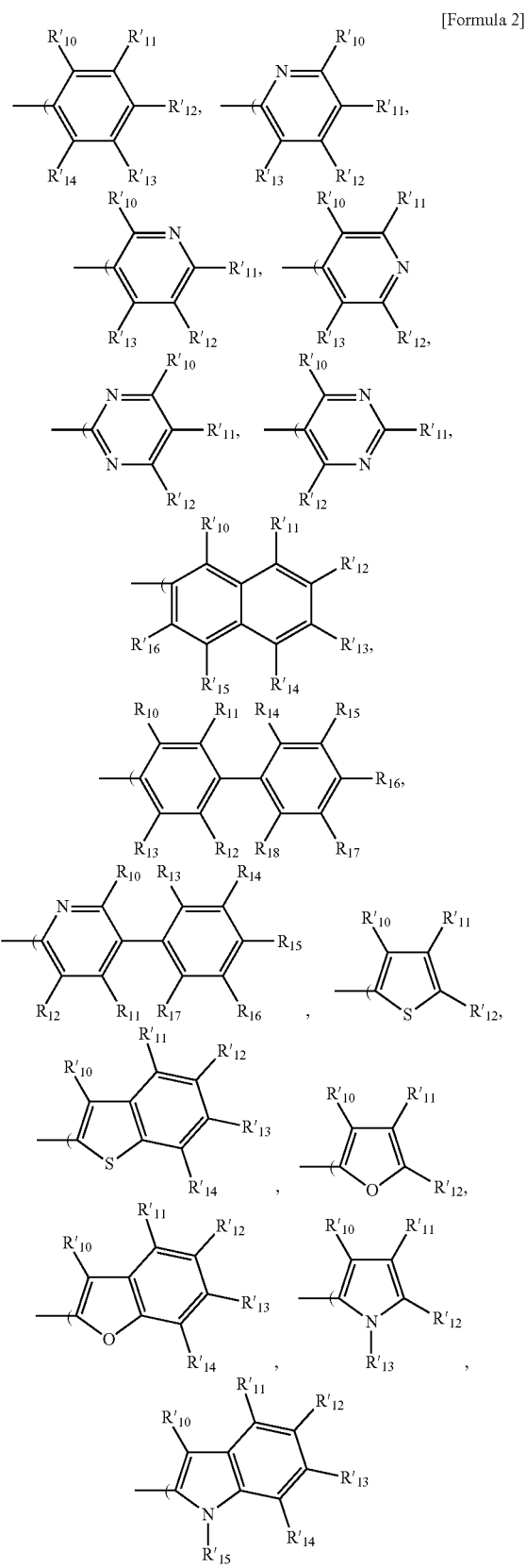

in Formulae 1a, 1b, and 1c,

A is substituted or unsubstituted C1-C20 alkylene, carbonyl, carboxy, substituted or unsubstituted C6-C40 arylene, or a simple bond;

B is oxygen, sulfur, —NH—, or a simple bond;

X is oxygen or sulfur;

$R_9$ is a simple bond, substituted or unsubstituted C1-C20 alkylene; substituted or unsubstituted C2-C20 alkenylene; substituted or unsubstituted C5-C12 cycloalkylene; substituted or unsubstituted C6-C40 arylene; substituted or unsubstituted C7-C15 aralkylene; or substituted or unsubstituted C2-C20 alkynylene;

$R_{10}$, $R_{11}$, $R_{12}$, and $R_{13}$ are each independently selected from the group consisting of substituted or unsubstituted C1-C20 alkyl, substituted or unsubstituted C1-C20 alkoxy, substituted or unsubstituted C6-C30 aryloxy, and substituted or unsubstituted C6-C40 aryl; and C is C6-C40 aryl; or C6-C40 hetero aryl that includes Group 14, 15 or 16 hetero elements (S, O, N or the like), and the aryl or hetero aryl is substituted with substituted or unsubstituted C1-C20 alkoxy or substituted or unsubstituted C6-C30 aryloxy. Representative examples of C include, but are not limited to, compounds that are represented by the following Formula 2.

In Formulae 1c and 2, at least one of $R'_{10}$, $R'_{11}$, $R'_{12}$, $R'_{13}$, $R'_{14}$, $R'_{15}$, $R'_{16}$, $R'_{17}$, and $R'_{18}$ is necessarily substituted or unsubstituted C1-C20 alkoxy or substituted or unsubstituted C6-C30 aryloxy, and the remains are each independently hydrogen, substituted or unsubstituted C1-C20 alkyl, substituted or unsubstituted C1-C20 alkoxy, substituted or unsubstituted C6-C30 aryloxy, or substituted or unsubstituted C6-C40 aryl.

In the present invention, an experiment in which a polarizer is disposed in front of a UV lamp to directly radiate the polarized UV to the alignment film is performed. In respects to the spectrum of the polarized UV, the intensity of light is significantly reduced at 300 nm or less, and the peak at around 365 nm is highest among the peaks that are most close to ultraviolet rays. Meanwhile, the UV absorption of the polymers that are aryl or heteroaryl in which C is substituted with the alkoxy group or the aryloxy group is red-shifted as compared to the polymers that are aryl in which C is substituted with hydrogen or the alkyl group. Accordingly, it is expected that the photoreaction rapidly occurs in the case of the polymers having the absorption spectrum that is close to the highest peak of UV in comparison with the cases of the other polymers.

In addition, the polymers that are aryl or heteroaryl in which C is substituted with the alkoxy group or the aryloxy group have increased compatibility in respects to the liquid crystals, thus directly affecting the alignment of the liquid crystals and significantly affecting the quality of the liquid crystal retardation film finally obtained.

The photoreactive ring-opened hydrogenated polymer that includes the multi-cyclic compound according to the present invention as the monomer in the main chain may include a repeating unit that is represented by the following Formula 3.

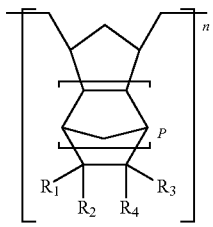

[Formula 3]

In Formula 3,
n is in the range of 50 to 5,000, and
P, $R_1$, $R_2$, $R_3$, and $R_4$ are the same as those defined in the above.

In addition, the ring-opened hydrogenated polymer that includes the multi-cyclic compound according to the present invention as a monomer may further include one or more of the multi-cyclic compounds that are represented by the following Formula 4 as the monomer:

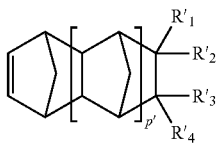

[Formula 4]

In Formula 4,
P' is an integer in the range of 0 to 4,
$R'_1$, $R'_2$, $R'_3$, and $R'_4$ are each independently selected from the group consisting of hydrogen; halogen; substituted or unsubstituted C1-C20 alkyl, substituted or unsubstituted C2-C20 alkenyl; substituted or unsubstituted C5-C12 cycloalkyl; substituted or unsubstituted C6-C40 aryl; substituted or unsubstituted C7-C15 aralkyl; substituted or unsubstituted C2-C20 alkynyl; and a non-hydrocarbonaceous polar group that includes one or more elements selected from the group consisting of oxygen, nitrogen, phosphorus, sulfur, silicon, and boron, if $R'_1$, $R'_2$, $R'_3$, and $R'_4$ are not hydrogen, halogen, or a polar functional group, $R'_1$, and $R'_2$, or $R'_3$ and $R'_4$ may be bonded to each other to form a C1-C10 alkylidene group, or $R'_1$ or $R'_2$ may be bonded to any one of $R'_3$ and $R'_4$ to form a saturated or unsaturated C4-C12 ring or an aromatic ring having 6 to 24 carbon atoms, specific examples of the non-hydrocarbonaceous polar group include, but are not limited to —$OR_6$, —$R_5OR_6$, —OC(O)$OR_6$, —$R_5OC(O)OR_6$, —C(O)$OR_6$, —$R_5C(O)OR_6$, —C(O)$R_6$, —$R_5C(O)R_6$, —OC(O)$R_6$, —$R_5OC(O)R_6$, —($R_5O)_p$—$OR_6$ (p is an integer in the range of 1 to 10), —($OR_5)_p$—$OR_6$ (p is an integer in the range of 1 to 10), —C(O)—O—C(O)$R_6$, —$R_5$C(O)—O—C(O)$R_6$, —$SR_6$, —$R_5SR_6$, —$SSR_6$, —$R_5SSR_6$, —S(=O)$R_6$, —$R_5$S(=O)$R_6$, —$R_5$C(=S)$R_6$, —$R_5$C(=S)$SR_6$, —$R_5SO_3R_6$, —$SO_3R_6$, —$R_5$N=C=S, —N=C=S, —NCO, —$R_5$—NCO, —CN, —$R_5$CN, —NNC(=S)$R_6$, —$R_5$NNC(=S)$R_6$, —$NO_2$, —$R_5NO_2$,

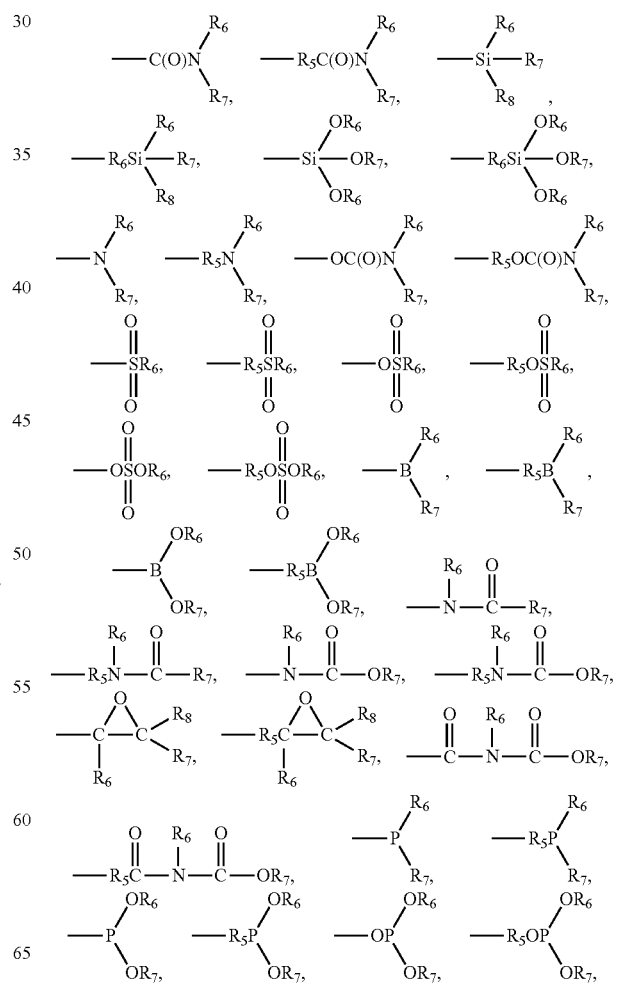

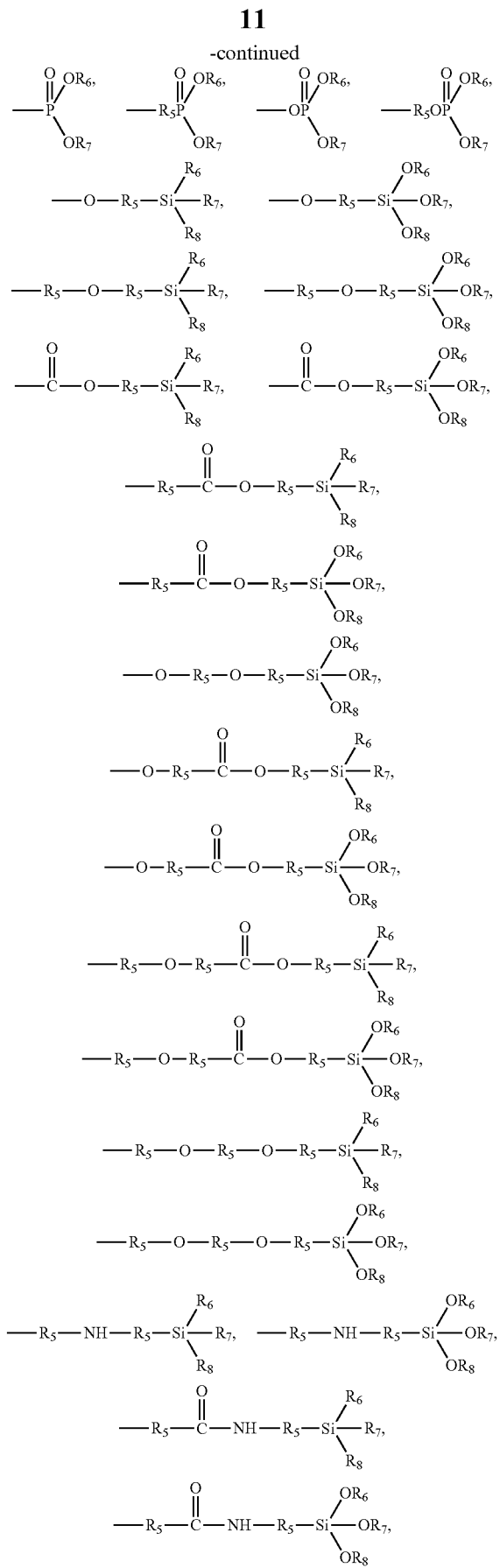
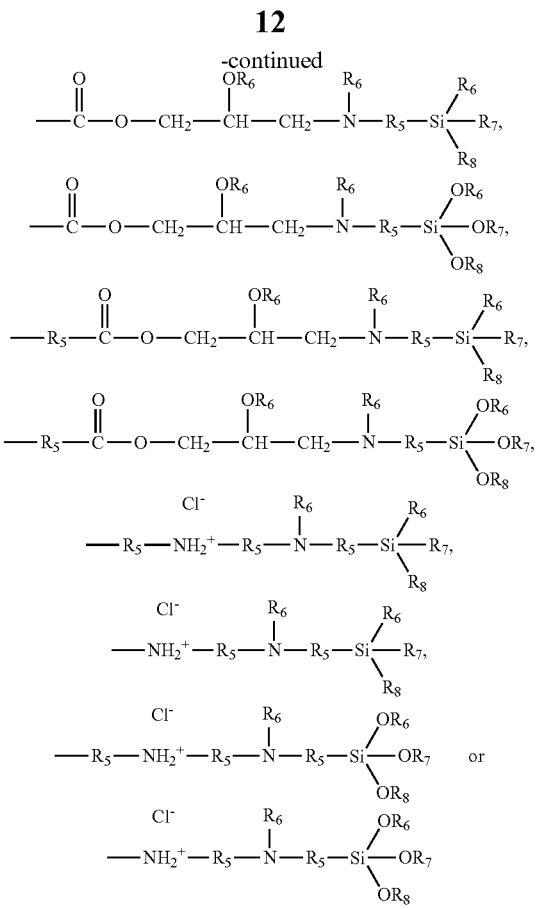

$R_5$ of each of the functional groups is substituted or unsubstituted C1-C20 alkylene; substituted or unsubstituted C2-C20 alkenylene; substituted or unsubstituted C5-C12 cycloalkylene; substituted or unsubstituted C6-C40 arylene; substituted or unsubstituted C7-C15 aralkylene; or substituted or unsubstituted C2-C20 alkynylene, and $R_6$, $R_7$ and $R_8$ are each hydrogen; halogen; substituted or unsubstituted C1-C20 alkyl; substituted or unsubstituted C2-C20 alkenyl; substituted or unsubstituted C5-C12 cycloalkyl; substituted or unsubstituted C6-C40 aryl; substituted or unsubstituted C7-C15 aralkyl; or substituted or unsubstituted C2-C20 alkynyl.

The definition of the above-mentioned substituent groups will be described in detail.

The term "alkyl" means a straight- or branched-chained saturated monovalent hydrocarbon portion having 1 to 20 carbon atoms, preferably 1 to 10 carbon atoms, and more preferably 1 to 6 carbon atoms. The alkyl group may be arbitrarily substituted with one or more halogen substituents. Examples of the alkyl group include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl and the like.

The term "alkenyl" means a straight- or branched-chained monovalent hydrocarbon portion having 2 to 20 carbon atoms, preferably 2 to 10 carbon atoms, and more preferably 2 to 6 carbon atoms having one or more carbon-carbon double bonds. The alkenyl group may be bonded through the carbon atoms having the carbon-carbon double bonds or the saturated carbon atoms. The alkenyl group may be arbitrarily substituted with one or more halogen substituents. Examples of the alkenyl group may include ethenyl, 1-propenyl, 2-propenyl, 2-butenyl, 3-butenyl, pentenyl, 5-hexenyl, dodecenyl and the like.

The term "cycloalkyl" means a saturated or unsaturated nonaromatic monovalent monocyclic, bicyclic or tricyclic hydrocarbon portion having 5 to 12 cyclic carbons, and may be arbitrarily substituted with one or more halogen substituents. Examples of the cycloalkyl may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (that is, bicyclo[2.2.1]hept-5-enyl) or the like.

The term "aryl" means a monovalent monocyclic, bicyclic or tricyclic aromatic hydrocarbon portion having 6 to 20 ring atoms, and preferably 6 to 12 ring atoms, and may be arbitrarily substituted with one or more halogen substituents and the like. The aromatic portion of the aryl group includes only a carbon atom. Examples of the aryl group may include phenyl, naphthalenyl, fluorenyl and the like.

The term "alkoxyaryl" means one or more hydrogen atoms of the aryl group defined as described above, which are substituted with the alkoxy group. Examples of the alkoxyaryl group may include methoxyphenyl, ethoxyphenyl, propoxyphenyl, butoxyphenyl, pentoxyphenyl, hetoxy phenyl, heptoxy phenyl, octoxyphenyl, nanoxyphenyl, methoxybiphenyl, ethoxybiphenyl, propoxybiphenyl, methoxynaphthalenyl, ethoxynaphthalenyl, propoxynaphthalenyl, methoxyanthracenyl, ethoxyanthracenyl, propoxyanthracenyl, methoxyfluorenyl and the like.

The term "araryl" means one or more hydrogen atoms of the alkyl group defined as described above, which are substituted with the aryl group. The aralkyl may be arbitrarily substituted with one or more halogen substituents. Examples of the aralkyl may include benzyl, benzhydril, tritile and the like.

The term "alkynyl" means a straight- or branched-chained monovalent hydrocarbon portion having 2 to 20 carbon atoms, preferably 2 to 10 carbon atoms, more preferably 2 to 6 carbon atoms having one or more carbon-carbon triple bonds. The alkynyl group may be bonded through the carbon atoms having the carbon-carbon triple bonds or the saturated carbon atoms. The alkynyl group may be arbitrarily substituted with one or more halogen substituents. Examples of the alkynyl group may include ethynyl, propynyl and the like.

The term "alkylene" means a straight- or branched-chained divalent saturated hydrocarbon portion having 1 to 20 carbon atoms, preferably 1 to 10 carbon atoms, more preferably 1 to 6 carbon atoms. The alkylene group may be arbitrarily substituted with one or more halogen substituents. Examples of the alkyl group may include methylene, ethylene, propylene, butylene, hexylene and the like.

The term "alkenylene" means a straight- or branched-chained divalent hydrocarbon portion having 2 to 20 carbon atoms, preferably 2 to 10 carbon atoms, more preferably 2 to 6 carbon atoms having one or more carbon-carbon double bonds. The alkenylene group may be bonded through the carbon atoms having the carbon-carbon double bonds and/or the saturated carbon atoms. The alkenylene group may be arbitrarily substituted with one or more halogen substituents.

The term "cycloalkylene" means a saturated or unsaturated nonaromatic divalent monocyclic, bicyclic or tricyclic hydrocarbon portion having 5 to 12 cyclic carbons, and may be arbitrarily substituted with one or more halogen substituents. Examples of the cycloalkylene may include cyclopropylene, cyclobutylene and the like.

The term "arylene" means a divalent monocyclic, bicyclic or tricyclic aromatic hydrocarbon portion having 6 to 20 cyclic atoms and preferably 6 to 12 cyclic atoms, and may be arbitrarily substituted with one or more halogen substituents. The aromatic portion of the aryl group includes only the carbon atoms. Examples of the arylene group may include phenylene and the like.

The term "aralkylene" means a divalent portion in which one or more hydrogen atoms of the alkyl group defined as described above are substituted with the aryl group, and may be arbitrarily substituted with one or more halogen substituents. Examples of the aralkylene may include benzylene and the like.

The term "alkynylene" means a straight- or branched-chained divalent hydrocarbon portion having 2 to 20 carbon atoms, preferably 2 to 10 carbon atoms, more preferably 2 to 6 carbon atoms having one or more carbon-carbon triple bonds. The alkynylene group may be bonded through the carbon atoms having the carbon-carbon triple bonds or the saturated carbon atoms. The alkynylene group may be arbitrarily substituted with one or more halogen substituents. Examples of the alkynylene group may include ethynylene, propynylene and the like.

The term "bond" means a bonding portion while no substituent group is inserted.

In respects to the multi-cyclic compound ring-opened hydrogenated polymer that includes the photoactive functional group, linear alkene such as 1-alkene, 2-alkene and the like, which is capable of controlling a size of a molecular weight, is added in an amount of 1 to 100 mol % based on the monomer in the presence of a catalyst mixture that consists of a procatalyst including Group 4 (for example, Ti, Zr, Hf), Group 6 (for example, Mo, W), and Group 8 (for example, Ru, Os) transition metal, a cocatalyst that provides a Lewis base capable of being weakly coordinate bonded to the metal of the procatalyst, and neutral Group 15 and Group 16 activators that selectively improve the activity of the procatalyst metal, the polymerization is performed at a temperature in the range of 10 to 200° C. After that, a catalyst that includes Group 4 (for example, Ti, Zr) or Group 8 to Group 10 (for example, Ru, Ni, Pd) transition metals is added in an amount of 1 to 30% by weight based on the monomer to add hydrogen to the double bond remaining on the main chain at the temperature in the range of 10 to 250° C.

In the case of when the reaction temperature is lower than 10° C., there is a problem in that the polymerization activity is very low. In the case of when the reaction temperature is higher than 200° C., the catalyst may be decomposed, which is undesirable. In the case of when the hydrogenation reaction temperature is lower than 10° C., there is a problem in that the activity of the hydrogenation reaction is very low. In the case of when the hydrogenation reaction temperature is higher than 250° C., the catalyst may be decomposed, which is undesirable.

The catalyst mixture includes 1 to 100,000 mole of the cocatalyst that provides a Lewis base capable of being weakly coordinate bonded to the metal of the procatalyst based on 1 mole of the procatalyst that includes Group 4 (for example, Ti, Zr, Hf), Group 6 (for example, Mo, W), and Group 8 (for example, Ru, Os) transition metals, and selectively 1 to 100 mole of the activator that includes neutral Group 15 and Group 16 elements improving the activity of the procatalyst metal based on 1 mole of the procatalyst.

In the case of when the content of the cocatalyst is less than 1 mole, there is a problem in that the activation of the catalyst is not ensured. In the case of when the content of the cocatalyst is more than 100,000 mole, the activity of the catalyst is reduced, which is undesirable. The activator may not be used according to the type of the procatalyst. In the case of when the content of activator is less than 1 mole, there is a problem in that the activation of the catalyst is not ensured. In the case of when the content of the activator is more than 100 mole, the molecular weight is reduced, which is undesirable.

In the case of when the content of the catalyst that includes the Group 4 (for example, Ti, Zr) or Groups 8 to 10 (for example, Ru, Ni, Pd) transition metals which are used during the hydrogenation reaction is less than 1% by weight based on the monomer, there is a problem in that the hydrogenation is not desirably performed. In the case of when the content of the catalyst is more than 30% by weight, the polymer may be discolored, which is undesirable.

The procatalyst that includes the Group 4 (for example, Ti, Zr, Hf), Group 6 (for example, Mo, W), and Group 8 (for example, Ru, Os) transition metals means a transition metal such as $TiCl_4$, $WCl_6$, $MoCl_5$, or $RuCl_3$ having the functional group that easily participates in the Lewis acid-base reaction to be separated from the central metal while the metal is easily separated by the cocatalyst providing the Lewis acid so that the central transition metal is converted into the catalyst active species.

In addition, the cocatalyst providing the Lewis base that is capable of being weakly coordination bonded to the metal of the procatalyst may use borane or borate such as $B(C_6F_5)_3$, methyl aluminoxane (MAO), or alkylaluminum, alkylaluminum halide, or aluminum halide such as $Al(C_2H_5)_3$ and $Al(CH_3)Cl_2$. Instead of aluminum, a substituent such as lithium, magnesium, germanium, lead, zinc, tin, silicon and the like may be used. The cocatalyst easily reacts with the Lewis base to form a vacancy of the transition metal, and provides a compound that is weakly coordination bonded to the transition metal compound or a compound providing the same in order to stabilize the generated transition metal.

The activator for polymerization may be added, but may not be used according to the type of the procatalyst. Examples of the activator that includes the neutral Group 15 and Group 16 elements capable of improving the activity of the procatalyst metal include water, methanol, ethanol, isopropyl alcohol, benzyl alcohol, phemol, ethyl mercaptan, 2-chloroethanol, trimethylamine, triethylamine, pyridine, ethylene oxide, benzoyl peroxide, t-butyl peroxide and the like.

The catalyst that includes the Group 4 (for example, Ti,Zr) or Groups 8 to 10 (for example, Ru, Ni, Pd) transition metals used during the hydrogenation reaction may be present in a homogeneous form that can be immediately mixed with a solvent or a substance in which the metal catalyst complex compound is carried in a fine supporting material. Preferable examples of the fine supporting material include silica, titania, silica/chromia, silica/chromia/titania, the silica/alumina, an aluminum phosphate gel, silanized silica, silica hydrogel, montmorilonite clay, and zeolite.

According to an embodiment of the present invention, the catalyst mixture that consists of a procatalyst including Group 4, Group 6, and Group 8 transition metals, a cocatalyst that provides a Lewis base capable of being weakly coordinate bonded to the metal of the procatalyst, and neutral Group 15 and Group 16 activators that selectively improve the activity of the procatalyst metal is prepared. Additionally, linear alkene may be further added to control the size of the molecular weight. Next, the monomer solution that includes the multi-cyclic compound having the photoactive functional group is subjected to the ring-opened polymerization in the presence of the organic solvent and the catalyst mixture and then subjected to the hydrogenation reaction. However, the order of the addition of the catalyst, the monomer, and the solvent is not limited.

A photoreactive polymer according to another embodiment of the present invention is a cycloolefin-noncycloolefin polymer that includes a repeating unit represented by the following Formula 5.

[Formula 5]

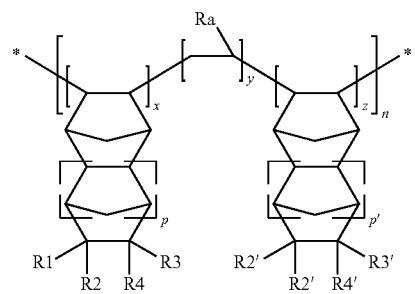

In Formula 5, n is the degree of polymerization in the range of 50 to 5000, the content of the repeating unit of cycloolefin that is represented by x is in the range of 0.1 to 99.9 mol %, the content of the repeating unit of linear olefin that is represented by y is in the range of 0.1 to 99.9 mol %, the content of the repeating unit of cycloolefin that is represented by z is in the range of 0.1 to 99.9 mol %, the order of the repetition of noncycloolefin and cycloolefin is random, P, $R_1$, $R_2$, $R_3$, and $R_4$ are the same as those defined in Formula 1, Ra is a hydrogen atom or a C1-C20 hydrocarbon group, and P', $R_1'$, $R_2'$, $R_3'$, and $R_4'$ are the same as those defined in Formula 4.

The "hydrocarbon group in Ra" includes alkyl, cycloalkyl, alkylene, and cycloalkylene as defined above, for example, α-olefin, butadiene, and pentadiene, and definitions of the other substituent groups are the same as those of the case of the photoreactive ring-opened hydrogenated polymer.

Hereinafter, a method of preparing the polymer that is used to form the alignment film will be described.

The cycloolefin-noncycloolefin polymer that includes the photoactive functional group is prepared by performing the polymerization in the presence of a catalyst mixture that consists of a procatalyst including the metallocene catalyst and a cocatalyst including aluminoxane at a temperature in the range of 10 to 200° C. under polymerization pressure in the range of 1 to 60 bar.

In the case of when the reaction temperature is less than 10° C., there is a problem in that the polymerization activity is very low. In the case of when the reaction temperature is higher than 200° C., the catalyst may be decomposed, which is undesirable.

Preferable examples of the procatalyst include the metallocene catalyst. Examples of the metallocene catalyst include a metallocene catalyst such as rac-ethylene-bis-(1-indenyl)-zirconiumdichloride, isopropylene-(9-fluorenyl)-cyclopentadienyl-zirconiumdichloride, rac-dimethylsilyl-bis-(1-indenyl)-zirconium dichloride, phenylmethyl-(9-fluorenyl)-cyclopentadienyl zirconium dichloride, rac-dimethylgermyl-bis-(1-indenyl)-zirconium dichloride, rac-phenylmethylsilyl-bis-(1-indenyl)-zirconium dichloride, and rac-phenylvinylsilyl-bis-(1-indenyl)-zirconium dichloride.

In addition, preferable examples of the cocatalyst include aluminoxane, and examples of aluminoxane include methyl aluminoxane, ethyl aluminoxane, isobutyl aluminoxane, butyl aluminoxane and the like.

In general, the transition metal compound (catalyst and cocatalyst) is previously activated in a solution. The concentration of aluminoxane that is present in a solution state is generally in the range of 1 wt % to the saturation concentration. Metallocene may be used at the same concentration, but it is preferable to use $10^{-4}$ to $10^{-2}$ mol of metallocene based on 1 mole of aluminoxane. The previous activation time is preferably in the range of 15 to 60 min, and at this time, the temperature is in the range of 15 to 70° C. In addition, it is preferable that the metallocene compound be generally used in an amount of $10^{-4}$ to $10^{-6}$ mole per 1 L of the volume of the reactor based on the transition metal. It is preferable that aluminoxane be used in an amount of $10^4$ mole per 1 L of the volume of the reactor based on the aluminum (Al). The incorporation ratio of the monomers depends on the polymerization conditions such as the reaction temperature, the reaction pressure, the concentration of the catalyst, the concentration of the cocatalyst and the like. It is preferable that the incorporation ratio of the cyclic monomer be in the range of 10 to 80 mol %.

The photoreactive polymer according to the present invention may be used to prepare an alignment film for liquid crystal display devices by applying the solution of the monomer on a substrate having a transparent electrode, removing a solvent to form a film, and radiating ultraviolet rays polarized in a predetermined direction thereon to provide an anisotropic property on the surface of the film.

MODE FOR THE INVENTION

A better understanding of the present invention may be obtained in light of the following Examples which are set forth to illustrate, but are not to be construed to limit the present invention.

In addition, in the following Examples, all the operations in which the compounds that were sensitive to air or water were treated were performed by using the standard Schlenk technique or the dry box technique. The nuclear magnetic resonance (NMR) spectrum was obtained by using the Bruker 300 spectrometer. In connection with this, the $^1$H NMR was measured at 300 MHz and the $^{13}$C NMR was measured at 75 MHz. The molecular weight and the molecular weight distribution of the ring-opened hydrogenated polymer were measured by using the GPC (gel permeation chromatography). In connection with this, the polystyrene sample was used as the standard sample.

Toluene was subjected to the distillation in potassium/benzophenone to be purified, and dichloromethane was subjected to the purification in $CaH_2$ by the distillation.

Preparing of the Photoreactive Ring-Opened Hydrogenated Polymer Including the Multi-Cyclic Compound

Example 1

Synthesis of 5-norbornene-2-methyl-4'-methoxy cinnamate Ring-Opened Hydrogenated Polymer (1) Synthesis of 5-norbornene-2-methanol DCPD (dicyclopentadiene, Aldrich, 397 g, 3 mol), and aryl alcohol (Aldrich, 331 g, 5.7 mol) were put into the high pressure reactor having the volume of 2 L and then heated to 210° C. The agitation was performed at 300 rpm to conduct the reaction for 1 hour. When the reaction was finished, the reactant was cooled and then moved to the distillation device. The distillation was performed twice under reduced pressure of 1 torr by using the vacuum pump to obtain the product at 56 t (yield: 52%).

1H-NMR (300 MHz, $CDCl_3$): δ6.17~5.91 (m, 2H), 3.71~3.19 (m, 2H), 2.91~2.75 (m, 2H), 2.38 (m, 1H), 1.83 (m, 1H), 1.60~1.12 (m, 2H), 0.52 (m, 1H)

(2) The Ring Opening Metathesis Polymerization and the Hydrogenation Reaction of 5-norbornene-2-methanol 6.20 g (50 mmol) of 5-norbornene-2-methanol that was synthesized in (1) was punt into the Schlenk flask having the volume of 250 ml under an Ar atmosphere, and 34 g of toluene that was purified by using the solvent was added thereto. 11.4 mg (1.0 mmol) of triethyl aluminum (TEA) that was the cocatalyst was first added thereto while the flask was maintained at the polymerization temperature of 80° C. Subsequently, 1 ml of the 0.01 M (mol/L) toluene solution ($WCl_6$ 0.01 mmol, ethanol 0.03 mmol) in which tungsten hexachloride ($WCl_6$) and ethanol were mixed with each other at a ratio in the range of 1:3 was added to the flask. Finally, 0.84 g of 1-octene (7.5 mmol) that was the molecular weight controlling agent was added to the flask and then reacted at 80° C. for 18 hours while the agitation was performed. After the reaction was finished, ethyl vinyl ether that was the polymerization terminator was dropped on the polymerization solution in a small amount and the agitation was then performed for 5 minutes.

The polymerization solution was transported to the high pressure reactor having the volume of 300 mL, and 0.06 ml of triethyl aluminum (TEA) was added thereto. Subsequently, 0.50 g of grace raney Nickel (slurry phase in water) was added thereto, and the reaction was performed while the pressure of hydrogen was maintained at 80 atm and the agitation was performed at 150° C. for 2 hours. After the reaction was finished, the polymerization solution was dropped on acetone to perform the precipitation, and the precipitate was filtered and then dried in a vacuum oven at 70° C. for 15 hours to obtain 5.62 g of ring-opened hydrogenated polymer of 5-norbornene-2-methanol (yield=90.6%, Mw=69,900, Mw/Mn=4.92).

(3) Synthesis of 4-methoxy cinnamoyl chloride 25 g of the 4-methoxy benzoic acid) (166.5 mmol) and 69.35 g of $SOCl_2$ (582.8 mmol) were put into the round-bottomed flask having the volume of 250 ml, and then agitated at normal temperature for 18 hours. After the reaction was finished, the reduced pressure was applied to remove an excessive amount of $SOCl_2$, and the reactant was diluted with 150 ml of toluene and neutralized by using the $NaHCO_3$ solution (100 ml×3). Water was removed from the neutralized toluene solution by using $MgSO_4$ and the solvent was removed under reduced pressure to obtain 31.1 g of 4-methoxy cinnamoyl chloride that was the white solid (yield=95%).

(4) Synthesis of 5-norbornene-2-methyl-4'-methoxy cinnamate Ring-Opened Hydrogenated Polymer The ring-opened hydrogen additional polymer (15 g, 0.121 mol) of 5-norbornene-2-methanol that was synthesized in (2), triethylamine (Aldrich, 61.2 g, 0.605 mol), 50 ml of THF were put into the 2-neck flask having the volume of 250 ml, and then agitated in the 0° C. ice-water bath. 4-methoxy cinnamoyl chloride (22.1 g, 0.133 mol) that was synthesized in (3) was dissolved in 60 ml of THF, and slowly added by using the additional flask. After 10 minutes, the temperature of the reactant was increased to normal temperature and the additional agitation was performed for 18 hours. The solution was diluted with ethyl acetate, transported to the separatory funnel, and washed several times by using water and $NaHCO_3$. The reaction solution was dropped in acetone to perform the precipitation, and the precipitate was filtered and then dried in a vacuum oven at 70° C. for 15 hours (yield: 94%).

Example 2

Synthesis of the 5-norbornene-2-(4'-hydroxy-4-methoxychalcone)ester Ring-Opened Hydrogenated Polymer (1) Synthesis of the Ring-Opened Hydrogenated Polymer of the 5-norbornene-2-carboxylic acid 11.0 g (79.64 mmol) of the 5-norbornene-2-carboxylic acid was put into the Schlenk flask having the volume of 250 ml under an Ar atmosphere, and 55 g of toluene that was purified by using the solvent was added thereto. 18.2 mg (1.6 mmol) of triethyl aluminum (TEA) that was the cocatalyst was first added thereto while the flask was maintained at the polymerization temperature of 80° C. Subsequently, 1.6 ml of the 0.01 M (mol/L) toluene solution ($WCl_6$ 0.016 mmol, ethanol 0.048 mmol) in which tungsten hexachloride ($WCl_6$) and ethanol were mixed with each other at a ratio in the range of 1:3 was added to the flask. Finally, 1.34 g of 1-octene (11.95 mmol) that was the molecular weight controlling agent was added to the flask and then reacted at 80° C. for 18 hours while the agitation was performed. After the reaction was finished, ethyl vinyl ether that was the polymerization terminator was dropped on the polymerization solution in a small amount and the agitation was then performed for 5 minutes.

The polymerization solution was transported to the high pressure reactor having the volume of 300 mL, and 0.38 ml of triethyl aluminum (TEA) was added thereto. Subsequently, 3.20 g of grace raney Nickel (slurry phase in water) was added thereto, and the reaction was performed while the pressure of hydrogen was maintained at 80 atm and the agitation was performed at 150° C. for 2 hours. After the reaction was finished, the polymerization solution was dropped on acetone to perform the precipitation, and the precipitate was filtered and then dried in a vacuum oven at 70° C. for 15 hours to obtain 10.1 g of ring-opened hydrogenated polymer of 5-norbornene-2-carboxylic acid (yield=92%, Mw=71,500, Mw/Mn=4.51).

(2) Synthesis of the 5-norbornene-2-(4'-hydroxy-4-methoxychalcone)ester Ring-Opened Hydrogenated Polymer 10.1 g of the ring-opened hydrogenated polymer of the 5-norbornene-2-carboxylic acid that was synthesized in (1) (71.55 mmol), 16.52 g of 4'-hydroxy-4-methoxychalcone) (65.0 mmol), 19.9 g of EDC(N-ethyl-N'-(3-dimethylaminopropyl)carbodiimide hydrochloride) (Aldrich, 104.2 mmol), and 13.2 g of HOBT (1-Hydroxybenzotriazole hydrate) (Aldrich, 97.52 mmol) were sequentially put into the two-neck flask having the volume of 250 ml, and then dissolved in 100 ml of DMF. After the temperature was reduced to 0° C., triethylamine (Aldrich, 45 ml, 325 mmol) was slowly dropped. After the temperature was increased to normal temperature and maintained overnight. When the reaction was finished, the extraction was performed by using a great amount of ethyl acetate. The resulting substance was washed by using $NaHCO_3$ and $H_2O$, the reaction solution was dropped on acetone to perform the precipitation, and the precipitate was filtered and then dried in a vacuum oven at 70° C. for 15 hours to obtain 9.4 g of ring-opened hydrogenated polymer of 5-norbornene-2-(4'-hydroxy-4-methoxychalcone) ester (yield=93%).

Example 3

Synthesis of the 5-norbornene-2-(7-hydroxy-6-methoxy coumarine)ester Ring-Opened Hydrogenated Polymer 10.1 g of the ring-opened hydrogenated polymer of the 5-norbornene-2-carboxylic acid that was synthesized in (1) of Example 2 (71.55 mmol), 12.49 g of 7-hydroxy-6-methoxycoumarin (Aldrich, 65.0 mmol), 19.9 g of EDC(N-ethyl-N'-(3-dimethylaminopropyl)carbodiimide hydrochloride) (Aldrich, 104.2 mmol), and 13.2 g of HOBT (1-Hydroxybenzotriazole hydrate) (Aldrich, 97.52 mmol) were sequentially put into the two-neck flask having the volume of 250 ml, and then dissolved in 100 ml of DMF. After the temperature was reduced to 0° C., triethylamine (Aldrich, 45 ml, 325 mmol) was slowly dropped. After the temperature was increased to normal temperature and maintained overnight. When the reaction was finished, the extraction was performed by using a great amount of ethyl acetate. The resulting substance was washed by using $NaHCO_3$ and $H_2O$, the reaction solution was dropped on acetone to perform the precipitation, and the precipitate was filtered and then dried in a vacuum oven at 70° C. for 15 hours to obtain 9.4 g of ring-opened hydrogenated polymer of 5-norbornene-2-(7-hydroxy-6-methoxy coumarine)ester (yield=93%).

Example 4

Synthesis of the Ring-Opened Hydrogenated Polymer to which the 4-propoxy cinnamoyl Group was Introduced (1) The Ring-Opened Hydrogenated Polymerization and the Hydrogenation Reaction of METCD 13.2 g of 8-methoxy-carbonyl tetracyclo[4,4,0,12,5,17,10]dode-3-cene (METCD) (0.1 mol) as the monomer, 1.1 g of 1-octene (10 mmol), and 60 ml of toluene that was purified by using the solvent were put into the schlenk flask having the volume of 250 ml. 0.02 mmol of $WCl_6$ that was dissolved in 1 ml of toluene and 0.14 mmol of triethylaluminum were put into the flask as the catalyst, and the reaction was performed while the agitation was performed at 80° C. for 18 hours. After the reaction was performed for 18 hours, the reactant was added to an excessive amount of acetone to obtain a ring-opened polymer precipitate. The ring-opened polymer that was obtained by filtering the precipitate using the glass funnel was dried in a vacuum oven at 70° C. for 24 hours to obtain 11.8 g of the METCD ring-opened polymer (yield: 90%).

15 g of the synthesized METCD ring-opened polymer, and 150 ml of toluene as the solvent were added to the high pressure reactor having the volume of 300 ml. 70 ppm of [$RuHCl(CO)(PCy_3)_3$] was added as the catalyst to the reactor, the hydrogen pressure of 10 Mpa was applied, and the agitation was performed at 165° C. for 4 hours to perform the hydrogenation reaction. After the reaction was finished, the hydrogen pressure was removed, and the reactant was added to an excessive amount of ethanol to obtain a ring-opened hydrogenated polymer precipitate. The polymer that was obtained by filtering the precipitate using the glass funnel was dried in a vacuum oven at 70° C. for 24 hours to obtain the ring-opened hydrogenated polymer (hydrogenation ratio: 99.7%, Mw=76,800, Mw/Mn=4.38).

(2) The Reduction Reaction of the METCD Ring-Opened Hydrogenated Polymer

The METCD ring-opened hydrogenated polymer (22 g, 0.1 mol) that was synthesized in (1), and 100 ml of THF were put into the 2-neck flask having the volume of 250 ml, and then agitated in the 0° C. ice-water bath. Lithiumaluminum hydride (LiAlH4) (Aldrich, 4.2 g, 0.11 mol) was dissolved in 10 ml of THF, and slowly added to the reactant by using the additional flask. After 2 hours, the temperature of the reactant was increased to normal temperature and the additional agitation was performed for 3 hours. The reaction solution was precipitated in a large amount of ethanol to obtain 15.4 g of the ring-opened hydrogenated polymer (ring-opened hydrogenated polymer of TCD-CH$_2$OH) in which the ester functional group of METCD was reduced to alcohol (yield: 70%).

(3) Synthesis of the Ring-Opened Hydrogenated Polymer to which the 4-propoxy cinnamoyl Group was Introduced (Esterification of the Ring-Opened Hydrogenated Polymer of TCD-CH$_2$OH)

The TCD-CH$_2$OH ring-opened hydrogenated polymer (2.3 g, 12.1 mmol) that was synthesized in (2), 4-propoxy cinnamic acid (2.49 g, 12.1 mmol), EDC [1-(3-dimethylaminopropyl)-3-ethylcarboimide hydrochloride] (Aldrich, 3.7 g, 19.4 mmol), and HOBT (1-hydroxybenzotriazole hydrate) (Aldrich, 2.45 g, 18.2 mmol) were put into the 2-neck flask having the volume of 250 ml, and then dissolved in 100 ml of DMF. Triethylamine (Aldrich, 75 ml, 0.605 mol) was slowly dropped on the reaction solution. After the agitation for 3 hours, when the reaction was finished, the reaction solution was precipitated in a large amount of acetone to obtain the ring-opened hydrogenated polymer to which the 4-propoxy cinnamoyl group was introduced (yield: 97%).

Preparation Example 1

Preparation of the Alignment Film by Using the 5-norbornene-2-methyl-4'-methoxy cinnamate Ring-Opened Hydrogenated Polymer The 5-norbornene-2-methyl-4'-methoxy cinnamate ring-opened hydrogenated polymer that was synthesized in Example 1 was dissolved in the c-pentanone solvent in a concentration of 2% by weight, and applied on the polyethylene terephthalate substrate (commercial name: SH71, prepared by SKC Co., Ltd. in Korea) having the thickness of 80 micron by using the roll coating process so that the thickness of the polyethylene terephthalate substrate was 1000 Å after the drying. Next, the substrate was heated in an oven at 80° C. for 3 minutes to remove the solvent in the inside of the coating film and to form the coating film.

The exposing was performed by using a high pressure mercury lamp having the intensity of 200 mW/cm$^2$ as a light source while polarized UV that was perpendicular to the proceeding direction of the film was radiated on the coating film by using a Wire-grid polarizer prepared by Moxtek, Co., Ltd. for 5 sec, so that the alignment was provided to form the alignment film.

Next, the solid in which 95.0% by weight of cyanobiphenyl acrylate that was polymerizable by UV and 5.0% by weight of Irgacure 907 (prepared by Ciba-Geigy, Co., Ltd. in Switzerland) as the photoinitiator were mixed with each other was dissolved in toluene so that the content of the liquid crystal was 25 parts by weight based on 100 parts by weight of the liquid crystal solution to prepare the polymerizable reactive liquid crystal solution.

The prepared liquid crystal solution was applied on the photo-alignment film that was formed by using a roll coating process so that the thickness of the film after the drying was 1 μm, and the drying was performed at 80° C. for 2 minutes to align the molecules of the liquid crystal. The nonpolarized UV was radiated on the aligned liquid crystal film by using a high-pressure mercury lamp having the intensity of 200 mW/cm$^2$ as a light source to fix the alignment state of the liquid crystal, thereby preparing the retardation film.

The alignment properties in respects to the prepared retardation film were compared to each other by measuring the light leakage between the polarizing plates by the transmittance, and the quantitative retardation value was measured by using Axoscan (prepared by Axomatrix, Co., Ltd.).

Preparation Example 2

Preparation of the Alignment Film by Using the 5-norbornene-2-(7-hydroxy-6-methoxy coumarine)ester Ring-Opened Hydrogenated Polymer The retardation film was prepared by using the same method as Preparation Example 1, except that the 5-norbornene-2-(7-hydroxy-6-methoxy coumarine)ester ring-opened hydrogenated polymer prepared in Example 3 was used instead of the polymer prepared in Example 1.

Preparation Example 3

Preparation of the Alignment Film by Using the Ring-Opened Hydrogenated Polymer to which the 4-propoxy cinnamoyl Group was Introduced The retardation film was prepared by using the same method as Preparation Example 1, except that the ring-opened hydrogenated polymer to which the 4-propoxy cinnamoyl group was introduced prepared in Example 4 was used instead of the polymer prepared in Example 1.

Comparative Example 1

The alignment film was prepared by using the same method as Preparation Example 1, except that the compound of the following Formula was used instead of the 5-norbornene-2-methyl-4-methoxy cinnamate ring-opened hydrogenated polymer used in Preparation Example 1.

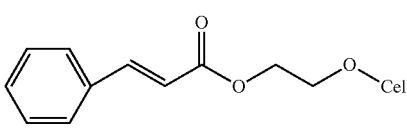

Cel = cellulose

Comparative Example 2

The alignment film was prepared by using the same method as Preparation Example 1, except that the 5-norbornene-2- methyl-cinnamate ring-opened hydrogenated polymer having no methoxy substituent of the following Formula was used instead of the 5-norbornene-2-methyl-4-methoxy cinnamate ring-opened hydrogenated polymer used in Preparation Example 1.

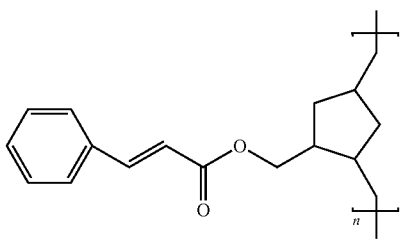

Experimental Example 1

Photoreactive Property Evaluation

FT-IR Spectrum

In order to obtain the photoreactive property of the alignment film, the FT-IR spectrum of each of the liquid crystal alignment films that were obtained in Preparation Examples 1 to 3 was observed, and the photoreactive properties were compared to each other based on the time ($t_{1/2}$) required until the intensity of the stretching mode of the C=C bond of the Formulae 1a to 1c of the polymer during the exposure (the mercury lamp having the intensity of 20 mW/cm$^2$ was used) was reduced by half and the energy value ($E_{1/2}$=20 mW/m$^2$, $t_{1/2}$). The results are described in the following Table 1.

From the comparison of $t_{1/2}$ values, it could be seen that in the case of Preparation Examples 1 to 3, the time was reduced by about 1/10 or more as compared to the case of Comparative Example 1 and thus the liquid crystal alignment film according to the present invention had the desirable photoreactive rate.

TABLE 1

| | $T_{1/2}$ (min) | $E_{1/2}$ (J/cm$^2$) |
|---|---|---|
| Preparation Example 1 | 0.9 | 1.1 |
| Preparation Example 2 | 1.0 | 1.2 |
| Preparation Example 3 | 0.8 | 1.0 |
| Comparative Example 1 | 9.3 | 11.2 |

Experimental Example 2

Evaluation of the alignment property (evaluation of the degree of light leakage)

In order to evaluate the alignment property of the alignment film, the liquid crystal retardation film that was prepared in Preparation Example 1 and Comparative Example 2 was observed between two polarizers that were perpendicular to each other by using a polarizing microscope, and the transmittance thereof is shown in FIG. 1. That is, in order to evaluate the transmittance, based on polyethylene terephthalate having a thickness of 80 microns (trademark: SH71, prepared by SKC, Co., Ltd. in Korea), the liquid crystal retardation film that was prepared in Preparation Example 1 and Comparative Example 2 was provided between the polarizers that were perpendicular to each other and the degree of transmittance of incident light through the polarizing plate and the retardation film was checked by using the polarizing microscope to measure the degree of light leakage, which is shown in FIG. 1. As shown in FIG. 1, in the retardation film of Preparation Example 1 according to the present invention, the alignment direction of liquid crystal was uniform regardless of the wavelength of incident light, but in the case of when the alignment film of Comparative Example 2 was applied, it could be seen that the alignment strength was reduced and the alignment direction of liquid crystal was not uniform.

Preparation of the Photoactive Polymer Including the Cycloolefin-Noncycloolefin Copolymer Compound Example 5

Synthesis of the 5-norbornene-2-methyl-(4-methoxy cinnamate)/ethylene copolymer (1) Protection of 5-norbornene-2-methanol 29.75 g of TiBAL (Triisobutyl aluminium, 0.15 mol) was put into the batch reactor having the volume of 250 ml that was dried in the ice bath while the agitation was performed, and 12.42 g of 5-norbornene-2-methanol (0.1 mole) was slowly added thereto and the agitation was performed for 20 minutes.

(2) Synthesis of the protected copolymer of 5-norbornene-2-methanol and ethylene After the dried batch reactor having the volume of 250 ml was prepared under an Ar atmosphere, 7.92 g of the protected 5-norbornene-2-methanol solution (30 mmol) and 50 ml of purified toluene were added thereto. After the temperature of the reactor was increased to 70° C., 0.3 μmol of isopropylene-(9-fluorenyl)-cyclopentadienyl-zirconium dichloride used as the catalyst and 1.2 mmol of MAO used as the cocatalyst were added thereto, and the polymerization was performed for 20 minutes while the pressure of ethylene was maintained at 75 psi. Next, ethylene was removed under excessive pressure, and the reaction solution was dropped on a large amount of methanol/hydrochloric acid aqueous solution (volume ratio 1/1) to obtain the polymer precipitate. The polymer that was obtained by filtering the precipitate by using the glass funnel was dried in a vacuum oven at 70° C. for 24 hours to obtain the 5-norbornene-2-methanol/ethylene copolymer (yield: 56.8%, Mw=74363, PDI=1.73).

(3) The Modification of the Cycloolefin Copolymer

Synthesis of the 5-norbornene-2-methyl-(4-methoxy cinnamate)/ethylene copolymer

The 5-norbornene-2-methanol/ethylene copolymer (18.4 g, 0.121 mol) that was polymerized in (2), 4-methoxy cinnamic acid (Aldrich, 21.5 g, 0.121 mol), EDC [1-(3-dimethyl-laminopropyl)-3-ethylcarboimide hydrochloride] (Aldrich, 37 g, 0.194 mol), and HOBT (1-hydroxybenzotriazole hydrate) (Aldrich, 24.5 g, 0.182 mol) were put into the 2-neck flask having the volume of 250 ml, and then dissolved in 100 ml of DMF. After the temperature was reduced to 0° C., triethylamine (Aldrich, 75 ml, 0.605 mol) was slowly dropped on the reaction solution. After the temperature was increased to normal temperature and maintained for 3 hours, when the reaction was finished, the reaction solution was dropped on a large amount of methanol to precipitate the polymer, and the polymer was filtered to obtain the 5-norbornene-2-methyl-(4-methoxy cinnamate)/ethylene copolymer to which the 4-methoxy cinnamoyl functional group was introduced (yield: 90.5%).

Example 6

Synthesis of 5-norbornene-2-(4'-hydroxy-4-methoxy chalcone) ester/ethylene copolymer (1) The Protection of the 5-norbornene-2-carboxylic acid 69.42 g of TiBAL (triisobutyl aluminium, 0.35 mol) was put into the batch reactor that was dried in the ice bath and had the volume of 250 ml, 13.8 g of the 5-norbornene-2-carboxylic acid (Aldrich, 0.1 mole) was slowly added thereto while the agitation was performed, and the additional agitation was performed for 20 minutes.

(2) Synthesis of the protected copolymer of the 5-norbornene-2-carboxylic acid and ethylene After the dried batch reactor having the volume of 250 ml was prepared under an Ar atmosphere, 8.35 g of the protected 5-norbornene-2-carboxylic acid solution (30 mmol) and 50 ml of purified toluene were added thereto. After the temperature of the reactor was increased to 70° C., 0.3 μmol of isopropylene-(9-fluorenyl)-cyclopentadienyl-zirconium dichloride used as the catalyst and 1.2 mmol of MAO used as the cocatalyst were added thereto, and the polymerization was performed for 20 minutes while the pressure of ethylene was maintained at 75 psi. Next, ethylene was removed under excessive pressure, and the reaction solution was dropped on a large amount of methanol/hydrochloric acid aqueous solution (volume ratio 1/1) to obtain the polymer precipitate. The polymer that was obtained by filtering the precipitate by using the glass funnel was dried in a vacuum oven at 70° C. for 24 hours to obtain the 5-norbornene-2-carboxylic acid/ethylene copolymer (yield: 22.7%, Mw=65543, PDI=1.65).

(3) The Modification of the cycloolefin copolymer

Synthesis of the 5-norbornene-2-(4'-hydroxy-4-methoxy chalcone) ester/ethylene copolymer The 5-norbornene-2-carboxylic acid/ethylene copolymer (13.2 g, 79.64 mmol) that was polymerized in (2), 4'-hydroxy-4-methoxy chalcone (Aldrich, 18.4 g, 72.4 mmol), EDC (Aldrich, 22.2 g, 115.84 mmol), and HOBT (Aldrich, 14.7 g, 108.6 mmol) were put into the 2-neck flask having the volume of 250 ml, and then dissolved in 100 ml of DMF. After the temperature was reduced to 0° C., triethylamine (Aldrich, 50 ml, 362 mmol) was slowly dropped on the reaction solution. After the temperature was increased to normal temperature and maintained for 3 hours, when the reaction was finished, the reaction solution was dropped on a large amount of methanol to precipitate the polymer, and the polymer was filtered to obtain the 5-norbornene-2-(4'-hydroxy-4-methoxy chalcone)ester/ethylene copolymer to which the 1-(3-methoxy phenyl)-3-(2-hydroxyphenyl)-2-propenone functional group was introduced (yield: 82.5%).

Example 7

Modification of Cycloolefin Copolymer

Synthesis of 5-norbornene-2-(7-hydroxy 6-methoxy coumarine)ester/ethylene copolymer The 5-norbornene-2-carboxylic acid/ethylene copolymer (13.2 g, 79.64 mmol) that was polymerized in (2) of Example 6,7-hydroxy 6-methoxy coumarine (Aldrich, 13.0 g, 72.4 mmol), EDC (Aldrich, 22.2 g, 115.84 mmol), and HOBT (Aldrich, 14.7 g, 108.6 mmol) were put into the 2-neck flask having the volume of 250 ml, and then dissolved in 100 ml of DMF. After the temperature was reduced to 0° C., triethylamine (Aldrich, 50 ml, 362 mmol) was slowly dropped on the reaction solution. After the temperature was increased to normal temperature and maintained for 3 hours, when the reaction was finished, the reaction solution was dropped on a large amount of methanol to precipitate the polymer, and the polymer was filtered to obtain the 5-norbornene-2-(7-hydroxy 6-methoxy coumarine) ester/ethylene copolymer to which the 7-hydroxy 6-methoxy coumarine functional group was introduced (yield: 73%).

Example 8

Preparation of the Phenylnorbornene/Ethylene Copolymer to which the Cinnamoyl Functional Group was Introduced (1) Polymerization of the Cycloolefin Copolymer Polymerization of the Copolymer of Phenyl NB and Ethylene 5.1 g of phenylnorbornene (30 mmol) as the monomer and 50 ml of toluene purified by the solvent were added to the dried batch reactor having the volume of 250 ml. After the temperature of the reactor was increased to 70° C., 0.3 μmol of [PhCH(fluorenyl)(Cp)]ZrCl$_2$ used as the catalyst and 1.2 mmol of MAO were added thereto, and the polymerization was performed for 20 minutes while the pressure of ethylene was maintained at 75 psi. Next, ethylene was removed under excessive pressure, and the reaction solution was dropped on a large amount of methanol/hydrochloric acid aqueous solution (volume ratio 1/1) to obtain the polymer precipitate. The polymer that was obtained by filtering the precipitate by using the glass funnel was dried in a vacuum oven at 70° C. for 24 hours to obtain the phenylnorbornene/ethylene copolymer (yield: 55%, Mw=89125, PDI=1.51).

(2) Synthesis of 4-methoxy cinnamoyl chloride 53.5 g of the 4-methoxy cinnamic acid (Aldrich 0.3 mol)) and 124.9 g of SOCl$_2$ (Thionyl Chloride, 1.05 mol) were put into the two-neck flask having the volume of 250 ml, and then reacted with each other at normal temperature for 24 hours. After the reaction was finished, the distillation was performed to remove an excessive amount of SOCl$_2$, and the reactant was diluted with 100 ml of toluene and neutralized by using the NaHCO$_3$ solution. After the neutralization, the resulting substance was dried by using anhydrous MgSO$_4$, and filtered, and the solvent was removed by using the rotary evaporator. Next, the substance was passed through the silica gel to remove the impurity, thus obtaining 36.5 g of the white solid (yield: 62%).

(3) Friedel-Crafts Acylation reaction

Preparation of the Phenylnorbornene/Ethylene Copolymer to which the Cinnamoyl Functional Group was Introduced 19.8 g of the phenylnorbornene/ethylene copolymer (0.1 mol) that was polymerized in (1), 29.4 g of 4-methoxy cinnamoyl chloride (0.15 mol) that was synthesized in (2), and 150 ml of $CH_3CN$ used as the solvent were added to the two-neck flask having the volume of 250 ml. 10 mol % $Cu(OTf)_2$ was added to the reaction solution as the catalyst, and the reaction was performed at 80° C. for 8 hours. Next, the reaction solution was dropped on a large amount of methanol to precipitate the polymer, the polymer was filtered to obtain the phenylnorbornene/ethylene copolymer to which the cinnamoyl functional group was introduced (yield: 87%).

Preparation Example 4

Preparation of the Alignment Film by using the 5-norbornene-2-methyl-(4-methoxy cinnamate)/ethylene copolymer polymer The 5-norbornene-2-methyl-(4-methoxy cinnamate)/ethylene copolymer polymer that was synthesized in Example 5 was dissolved in the c-pentanone solvent in a concentration of 2% by weight, and applied on the polyethylene terephthalate substrate (commercial name: SH71, prepared by SKC Co., Ltd. in Korea) having the thickness of 80 micron by using the roll coating process so that the thickness of the polyethylene terephthalate substrate was 1000 Å after the drying. Next, the substrate was heated in an oven at 80° C. for 3 minutes to remove the solvent in the inside of the coating film and to form the coating film. The exposing was performed by using a high pressure mercury lamp having the intensity of 200 $mW/cm^2$ as a light source while polarized UV that was perpendicular to the proceeding direction of the film was radiated on the coating film by using a Wire-grid polarizer prepared by Moxtek, Co., Ltd. for 5 sec, so that the alignment was provided to form the alignment film. Next, the solid in which 95.0% by weight of cyanobiphenyl acrylate that was polymerizable by UV and 5.0% by weight of Irgacure 907 (prepared by Ciba-Geigy, Co., Ltd. in Switzerland) as the photoinitiator were mixed with each other was dissolved in toluene so that the content of the liquid crystal was 25 parts by weight based on 100 parts by weight of the liquid crystal solution to prepare the polymerizable reactive liquid crystal solution. The prepared liquid crystal solution was applied on the photoalignment film that was formed by using a roll coating process so that the thickness of the film after the drying was 1 μm, and the drying was performed at 80° C. for 2 minutes to align the molecules of the liquid crystal. The nonpolarized UV was radiated on the aligned liquid crystal film by using a high-pressure mercury lamp having the intensity of 200 $mW/cm^2$ as a light source to fix the alignment state of the liquid crystal, thereby preparing the retardation film.

Preparation Example 5

Preparation of the Alignment Film by using the 5-norbornene-2-(4'-hydroxy-4-methoxy chalcone)ester/ethylene copolymer The retardation film was prepared by using the same method as Preparation Example 4, except that the polymer prepared in Example 6 was used instead of the polymer prepared in Example 5.

Preparation Example 6

5-norbornene-2-(7-hydroxy 6-methoxy coumarine)ester/ethylene copolymer

The retardation film was prepared by using the same method as Preparation Example 4, except that the polymer prepared in Example 7 was used instead of the polymer prepared in Example 5.

Preparation Example 7

Phenylnorbornene/ethylene Copolymer to which the Cinnamoyl Functional Group was Introduced The retardation film was prepared by using the same method as Preparation Example 4, except that the polymer prepared in Example 8 was used instead of the polymer prepared in Example 5.

Comparative Example 3

The alignment film was prepared by using the same method as Preparation Example 4, except that the compound of Comparative Example 1 was used.

Comparative Example 4

The alignment film was prepared by using the same method as Preparation Example 4, except that the 5-norbornene-2-methyl-cinnamate/ethylene copolymer having no methoxy substituent, which was represented by the following Formula, was used instead of the 5-norbornene-2-methyl-(4-methoxy cinnamate)/ethylene copolymer of Preparation Example 4.

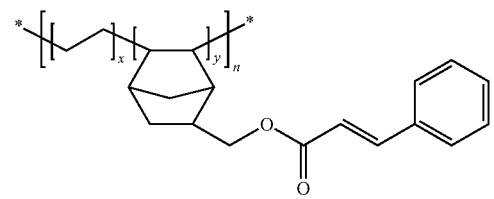

Experimental Example 3

Photoreactive Property Evaluation

FT-IR Spectrum

In order to obtain the photoreactive property of the alignment film, the FT-IR spectrum of each of the liquid crystal alignment films that were obtained in Preparation Examples 4 to 7 and Comparative Example 3 was observed, and the photoreactive properties were compared to each other based on the time ($t_{1/2}$) required until the intensity of the stretching mode of the C=C bond of the Formulae 1a to 1c of the polymer during the exposure (the mercury lamp having the intensity of 20 $mW/cm^2$ was used) was reduced by half and the energy value ($E_{1/2}$=20 $mW/cm^2$, $t_{1/2}$). The results are described in the following Table 2. From the comparison of $t_{112}$ values, it could be seen that in the case of Preparation Examples 4 to 7, the time was reduced by about ⅒ to ¼ as compared to the case of Comparative Example 3 and thus the liquid crystal alignment film according to the present invention had the desirable photoreactive rate.

TABLE 2

|  | $T_{1/2}$ (min) | $E_{1/2}$ (J/cm$^2$) |
|---|---|---|
| Preparation Example 4 | 1.0 | 1.1 |
| Preparation Example 5 | 1.3 | 1.4 |
| Preparation Example 6 | 1.5 | 1.8 |
| Preparation Example 7 | 1.6 | 1.9 |
| Comparative Example 3 | 9.3 | 11.2 |

Experimental Example 4

Evaluation of the Alignment Property

Evaluation of the Degree of Light Leakage

Figure 2:
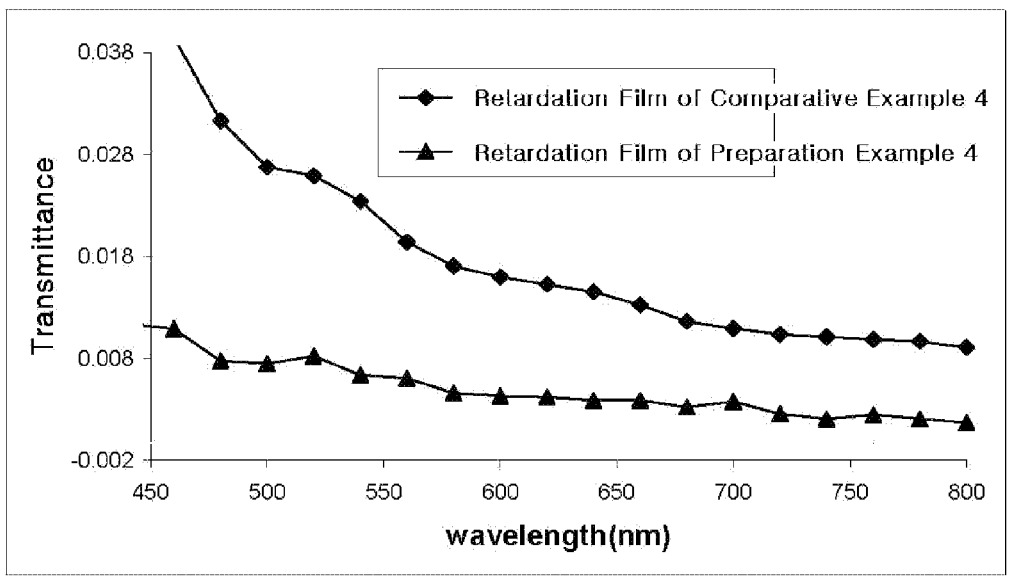
FIG. 2 is a graph that illustrates the measurement of light leakage of a retardation film that is prepared in Preparation Example 4 and Comparative Example 3.

In order to evaluate the alignment property of the alignment film, the liquid crystal retardation film that was prepared in Preparation Example 4 and Comparative Example 4 was observed between two polarizers that were perpendicular to each other by using a polarizing microscope, and the transmittance thereof is shown in FIG. 2. That is, in order to evaluate the transmittance, based on polyethylene terephthalate having a thickness of 80 microns (trademark: SH71, prepared by SKC, Co., Ltd. in Korea), the liquid crystal retardation film that was prepared in Preparation Example 4 and Comparative Example 4 was provided between the polarizers that were perpendicular to each other and the degree of transmittance of incident light through the polarizing plate and the retardation film was checked by using the polarizing microscope to measure the degree of light leakage, which is shown in FIG. 2. As shown in FIG. 2, in the retardation film of Preparation Example 4 according to the present invention, the alignment direction of liquid crystal was uniform regardless of the wavelength of incident light, but in the case of when the alignment film of Comparative Example 4 was applied, it could be seen that the alignment strength was reduced and the alignment direction of liquid crystal was not uniform, thus, the transmittance was increased.

The invention claimed is:
1. A multi-cyclic compound that is represented by the following Formula 1:

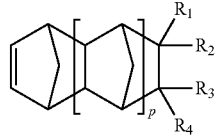

<Formula 1> wherein P is an integer in the range of 0 to 4,
at least one of $R_1$, $R_2$, $R_3$, and $R_4$ is a radical that is selected from the group consisting of the following Formula 1a,
the remains of $R_1$, $R_2$, $R_3$, and $R_4$ are each independently selected from the group consisting of hydrogen; halogen; substituted or unsubstituted C1-C20 alkyl; substituted or unsubstituted C2-C20 alkenyl; substituted or unsubstituted saturated or unsaturated C5-C12 cycloalkyl; substituted or unsubstituted C6-C40 aryl; substituted or unsubstituted C7-C15 aralkyl; substituted or unsubstituted C2-C20 alkynyl; and a non-hydrocarbonaceous polar group that comprises one or more elements selected from the group consisting of oxygen, nitrogen, phosphorus, sulfur, silicon, and boron,
$R_1$ and $R_2$ or $R_3$ and $R_4$ are optionally bonded to each other to form a C1-C10 alkylidene group, or $R_1$ or $R_2$ are optionally bonded to any one of $R_3$ and $R_4$ to form a saturated or unsaturated C4-C12 ring or an aromatic ring having 6 to 24 carbon atoms,

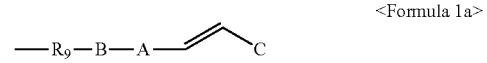

<Formula 1a> wherein A is substituted or unsubstituted C1-C20 alkylene, carbonyl, carboxy, substituted or unsubstituted C6-C40 arylene, or a single bond;
B is oxygen, sulfur, —NH—, or a single bond;
$R_9$ is a single bond, substituted or unsubstituted C1-C20 alkylene; substituted or unsubstituted C2-C20 alkenylene; substituted or unsubstituted C5-C12 cycloalkylene; substituted or unsubstituted C6-C40 arylene; substituted or unsubstituted C7-C15 aralkylene; or substituted or unsubstituted C2-C20 alkynylene;
C is C6-C40 aryl; or C6-C40 hetero aryl that comprises Group 14, 15 or 16 hetero elements, and the aryl or hetero aryl is substituted with substituted or unsubstituted C1-C20 alkoxy or substituted or unsubstituted C6-C30 aryloxy;
the non-hydrocarbonaceous polar group is —OR$_6$, —OC(O)OR$_6$, —R$_5$OR$_6$, —R$_5$OC(O)OR$_6$, —C(O)OR$_6$, —R$_5$C(O)OR$_6$, —C(O)R$_6$, —R$_5$C(O)R$_6$, —OC(O)R$_6$, —R$_5$OC(O)R$_6$, —(R$_5$O)$_p$—OR$_6$ (p is an integer in the range of 1 to 10), —(OR$_5$)$_p$—OR$_6$ (p is an integer in the range of 1 to 10), —C(O)—O—C(O)R$_6$, —R$_5$C(O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S)R$_6$, —R$_6$C(=S)SR$_6$, —R$_5$SO$_3$R$_6$, —SO$_3$R$_6$, —R$_5$N=C=S, —N=C=S, —NCO, —R$_5$—NCO, —CN, —R$_5$CN, —NNC(=S)R$_6$, —R$_5$NNC(=S)R$_6$, —NO$_2$, —R$_5$NO$_2$,

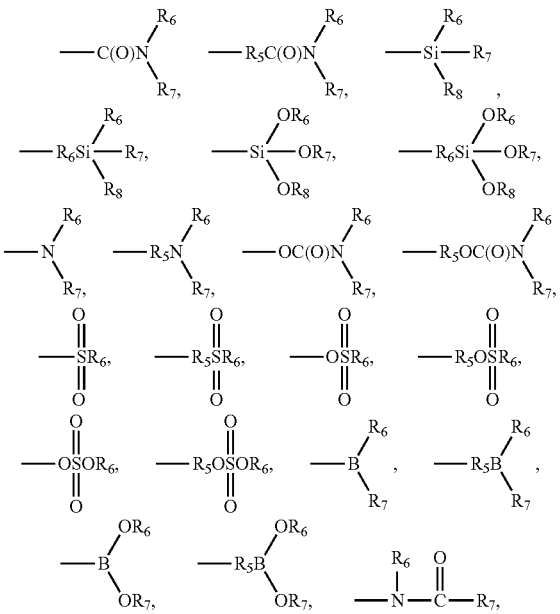

-continued

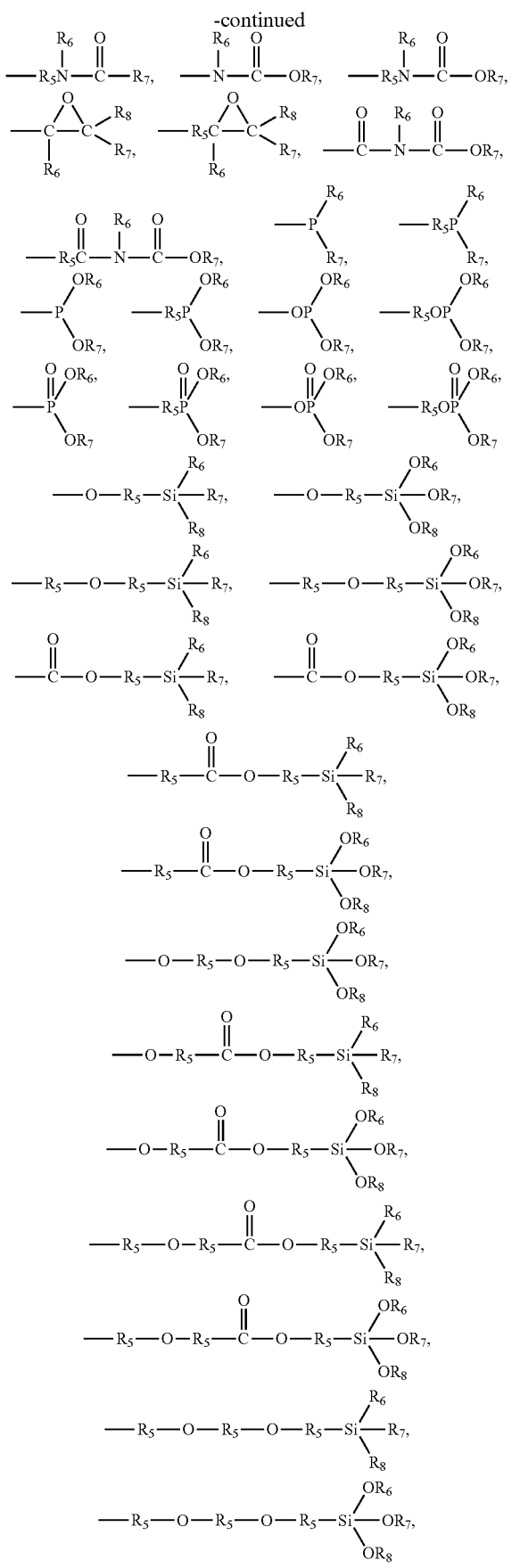

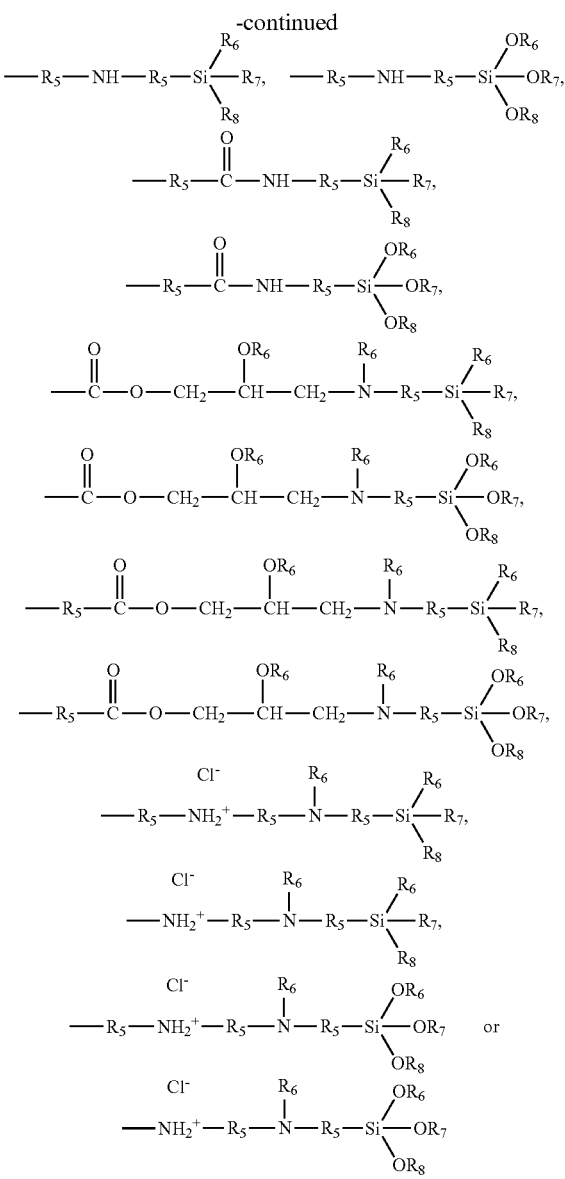

in the non-hydrocarbonaceous polar group, $R_5$ are optionally selected from the group consisting of substituted or unsubstituted C1-C20 alkylene; substituted or unsubstituted C2-C20 alkenylene; substituted or unsubstituted saturated or unsaturated C5-C12 cycloalkylene; substituted or unsubstituted C6-C40 arylene; substituted or unsubstituted C7-C15 aralkylene; and substituted or unsubstituted C2-C20 alkynylene, and $R_6$, $R_7$ and $R_8$ are optionally selected from the group consisting of hydrogen; halogen; substituted or unsubstituted C1-C20 alkyl; substituted or unsubstituted C2-C20 alkenyl; substituted or unsubstituted saturated or unsaturated C5-C12 cycloalkyl; substituted or unsubstituted C6-C40 aryl; substituted or unsubstituted C7-C15 aralkyl; and substituted or unsubstituted C2-C20 alkynyl.

2. The multi-cyclic compound as set forth in claim 1, wherein in Formula 1a, C is any one selected from the group consisting of compounds represented by the following Formulae:

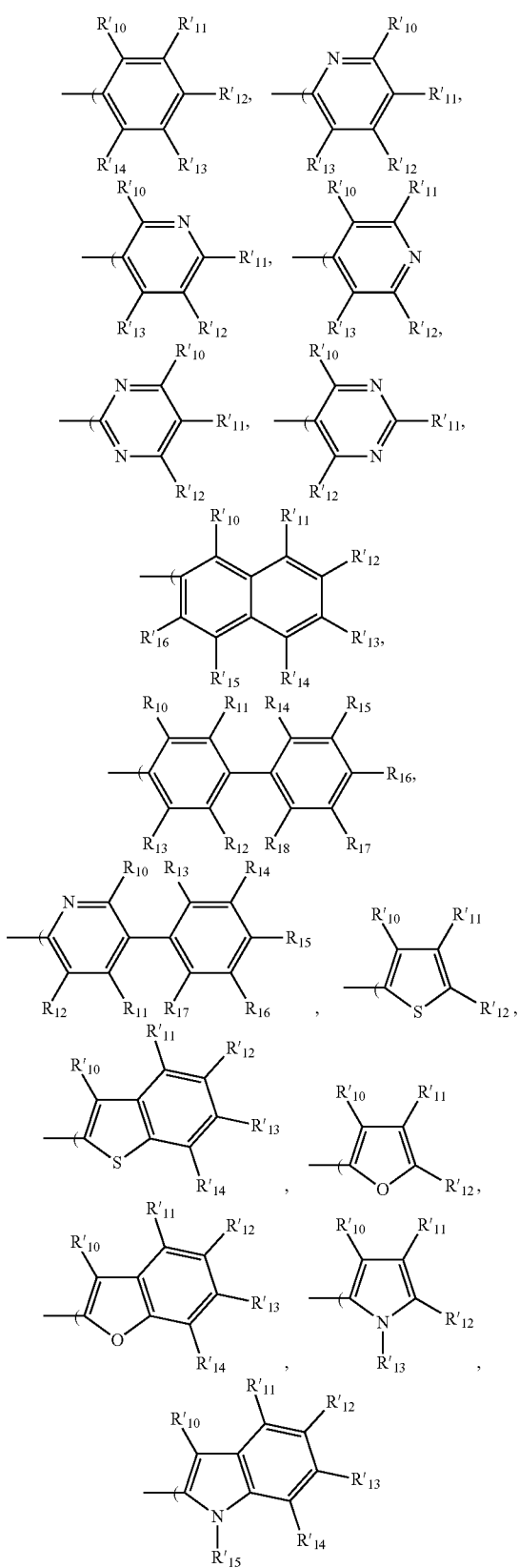

wherein R'₁₀, R'₁₁, R'₁₂, R'₁₃, R'₁₄, R'₁₅, R'₁₆, R'₁₇, and R'₁₈ are each independently hydrogen, substituted or unsubstituted C1-C20 alkyl, substituted or unsubstituted C1-C20 alkoxy, substituted or unsubstituted C6-C30 aryloxy, or substituted or unsubstituted C6-C40 aryl, with the proviso that at least one of R'₁₀, R'₁₁, R'₁₂, R'₁₃, R'₁₄, R'₁₅, R'₁₆, R'₁₇, and R'₁₈ is substituted or unsubstituted C1-C20 alkoxy or substituted or unsubstituted C6-C30 aryloxy.

3. A photoreactive polymer comprising the compound of claim 1 as a monomer repeating unit in a main chain and the repeating unit that is represented by the following Formula 3:

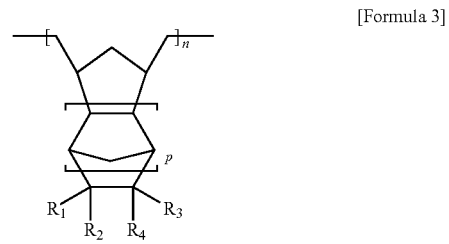

[Formula 3]

wherein n is in the range of 50 to 5,000, and
P, R1, R2, R3, and R4 are the same as those defined in Formula 1.

4. The photoreactive polymer as set forth in claim 3, wherein in Formula 1a, C is any one selected from the group consisting of compounds represented by the following Formulae:

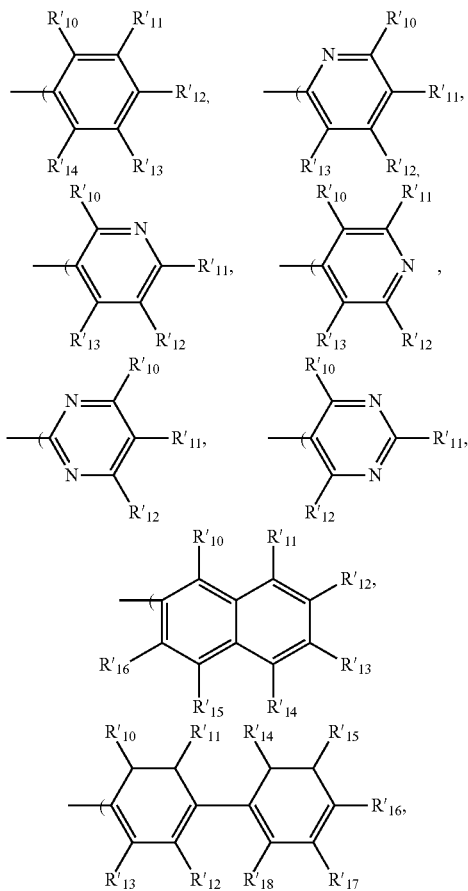

-continued

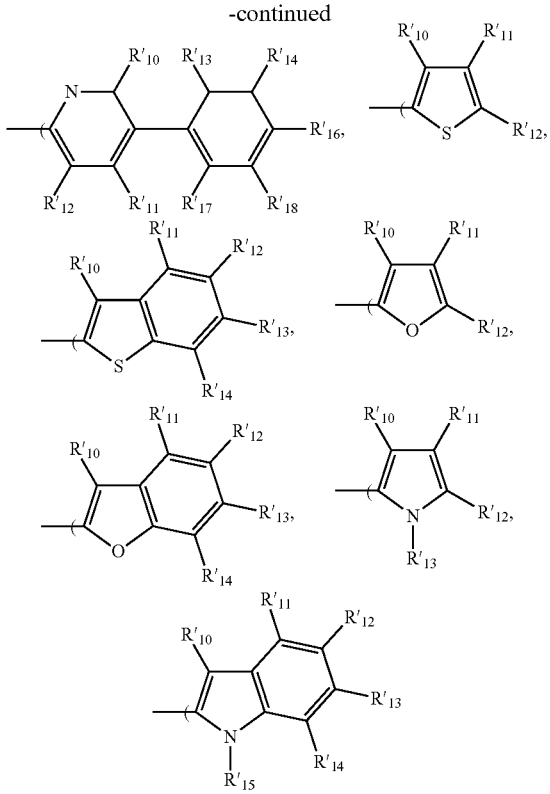

wherein at least one of R'$_{10}$, R'$_{11}$, R'$_{12}$, R'$_{13}$, R'$_{14}$, R'$_{15}$, R'$_{16}$, R'$_{17}$, and R'$_{18}$ is necessarily substituted or unsubstituted C1-C20 alkoxy or substituted or unsubstituted C6-C30 aryloxy, and the remains are each independently hydrogen, substituted or unsubstituted C1-C20 alkyl, substituted or unsubstituted C1-C20 alkoxy, substituted or unsubstituted C6-C30 aryloxy, or substituted or unsubstituted C6-C40 aryl.

5. The photoreactive polymer as set forth in claim 3, further comprising one or more of the multi-cyclic compounds that are represented by the following Formula 4 as a monomer:

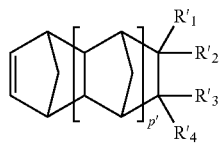

wherein P' is an integer in the range of 0 to 4,

R'$_1$, R'$_2$, R'$_3$, and R'$_4$ are each independently selected from the group consisting of hydrogen; halogen; substituted or unsubstituted C1-C20 alkyl, substituted or unsubstituted C2-C20 alkenyl; substituted or unsubstituted C5-C12 cycloalkyl; substituted or unsubstituted C6-C40 aryl; substituted or unsubstituted C7-C15 aralkyl; substituted or unsubstituted C2-C20 alkynyl; and a non-hydrocarbonaceous polar group that comprises one or more elements selected from the group consisting of oxygen, nitrogen, phosphorus, sulfur, silicon, and boron, when R'$_1$, R'$_2$, R'$_3$, and R'$_4$ are not hydrogen, halogen, or a polar functional group, R'$_1$, and R'$_2$, or R'$_3$ and R'$_4$ are optionally bonded to each other to form a C1-C10 alkylidene group, or R'$_1$ or R'$_2$ are optionally bonded to any one of R'$_3$ and R'$_4$ to form a saturated or unsaturated C4-C12 ring or an aromatic ring having 6 to 24 carbon atoms, the non-hydrocarbonaceous polar group is —OR$_6$, —OC(O)OR$_6$, —R$_5$OR$_6$, —R$_5$OC(O)OR$_6$, —C(O)OR$_6$, —R$_5$C(O)OR$_6$, —C(O)R$_6$, —R$_5$C(O)R$_6$, —OC(O)R$_6$, —R$_5$OC(O)R$_6$, —(R$_{50}$)$_p$—OR$_6$ (p is an integer in the range of 1 to 10), —(OR$_5$)$_p$—OR$_6$ (p is an integer in the range of 1 to 10), —C(O)—O—C(O)R$_6$, —R$_5$C(O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S)R$_6$, —R$_5$C(=S)SR$_6$, —R$_5$SO$_3$R$_6$, —SO$_3$R$_6$, —R$_5$N=C=S, —N=C=S, —NCO, —R$_5$—NCO, —CN, —R$_5$CN, —NNC(=S)R$_6$, —R$_5$NNC(=S)R$_6$, —NO$_2$, —R$_5$NO$_2$,

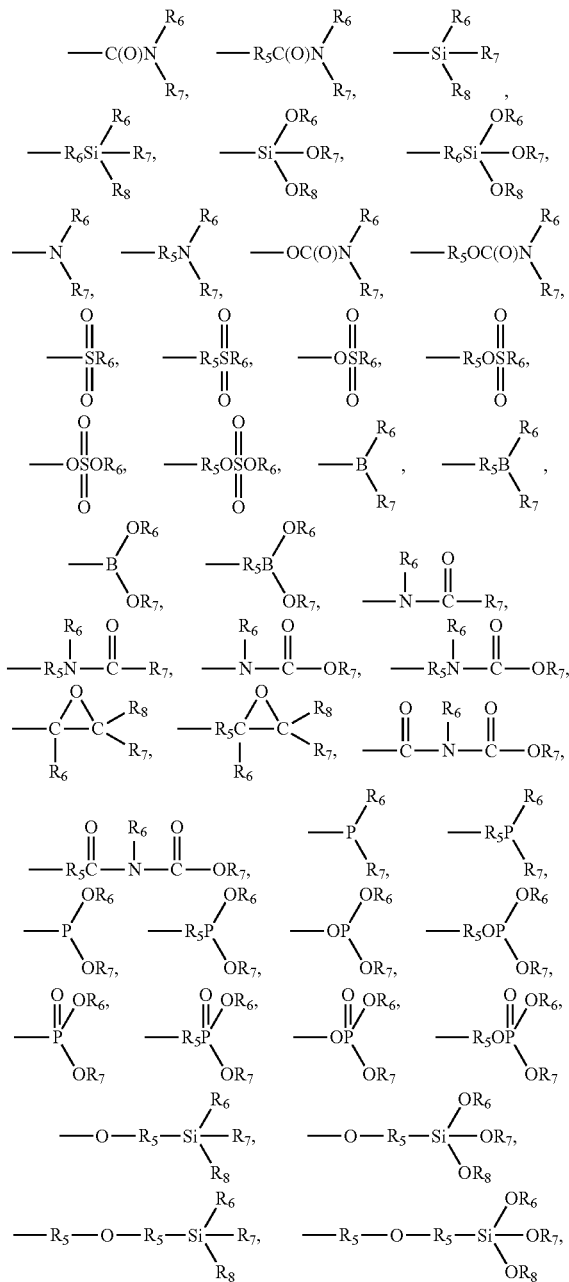

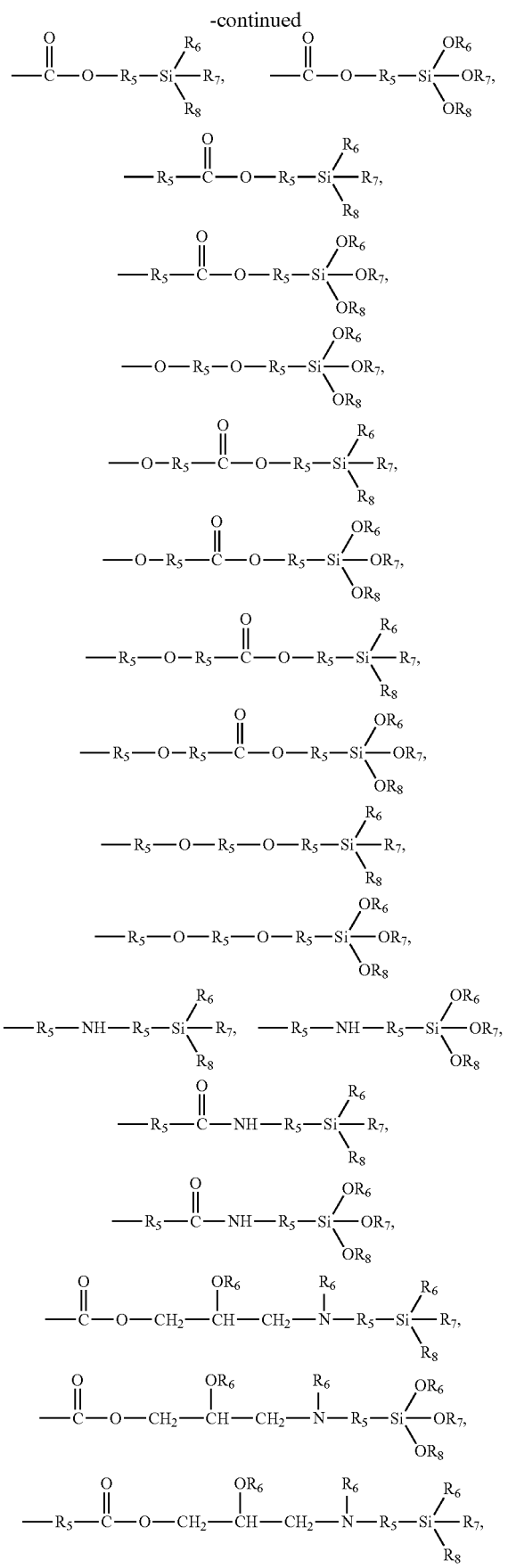

R$_5$ of each of the functional groups is substituted or unsubstituted C1-C20 alkylene; substituted or unsubstituted C2-C20 alkenylene; substituted or unsubstituted C5-C12 cycloalkylene; substituted or unsubstituted C6-C40 arylene; substituted or unsubstituted C7-C15 aralkylene; or substituted or unsubstituted C2-C20 alkynylene, and R$_6$, R$_7$ and R$_8$ are each hydrogen; halogen; substituted or unsubstituted C1-C20 alkyl; substituted or unsubstituted C2-C20 alkenyl; substituted or unsubstituted C5-C12 cycloalkyl; substituted or unsubstituted C6-C40 aryl; substituted or unsubstituted C7-C15 aralkyl; or substituted or unsubstituted C2-C20 alkynyl.

6. A method of preparing a photoreactive polymer, the method comprising:

polymerizing the multi-cyclic compound of claim 1 in the presence of a catalyst mixture that comprises a procatalyst including Group 4, Group 6, and Group 8 transition metals, a occatalyst that provides a Lewis base capable of being weakly coordinate bonded to the metal of the procatalyst, and selectively activators including neutral Group 15 and Group 16 elements that may improve the activity of the procatalyst metal, at a temperature in the range of 10 to 200° C. while linear alkene, which is capable of controlling a size of a molecular weight, is added; and adding a catalyst that comprises Group 4 or Group 8 to Group 10 transition metals to add hydrogen to a double bond remaining on a main chain at a temperature in the range of 10 to 250° C.

7. The method of preparing a photoreactive polymer as set forth in claim 6, wherein the catalyst mixture comprises 1 to 100,000 mole of the cocatalyst, and selectively 1 to 100 mole of the activators that comprises neutral Group 15 and Group 16 elements improving the activity of the procatalyst metal based on 1 mole of the procatalyst.

8. The method of preparing a photoreactive polymer as set forth in claim 6, wherein the procatalyst is selected from the group consisting of TiCl$_4$, WCl$_6$, MoCl$_5$, RuCl$_3$, and ZrCl$_4$.

9. The method of preparing a photoreactive polymer as set forth in claim 6, wherein the cocatalyst is selected from the group consisting of substituents comprising borane, borate, alkylaluminum, alkyl aluminoxane, alkylaluminum halide, aluminum halide, lithium, magnesium, germanium, lead, zinc; tin, and silicon.

10. The method of preparing a photoreactive polymer as set forth in claim 6, wherein the catalyst mixture comprises linear alkene, which is capable of controlling the size of the molecular weight, in an amount of 1 to 100 mol % based on the monomer that is the multi-cyclic compound.

11. The method of preparing a photoreactive polymer as set forth in claim 6, wherein the catalyst that comprises the Group 4, Group 8, Group 9, or Group 10 transition metals used during the hydrogenation reaction is present in a homogeneous form that can be immediately mixed with a solvent or a substance in which the metal catalyst complex compound is carried in a fine supporting material, and the fine supporting material is silica, titania, silica/chromia, silica/chromia/titania, silica/alumina, aluminum phosphate gel, silanized silica, silica hydrogel, montmorilonite clay, or zeolite.

12. A photoreactive polymer that is represented by the following Formula 5:

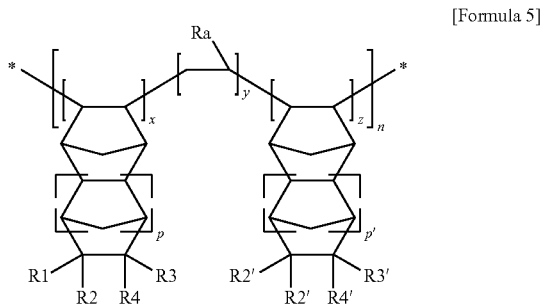

[Formula 5]

wherein n is the degree of polymerization in the range of 50 to 5000, the content of the repeating unit of cycloolefin that is represented by x is in the range of 0.1 to 99.9 mol %, the content of the repeating unit of linear olefin that is represented by y is in the range of 0.1 to 99.9 mol %, the content of the repeating unit of cycloolefin that is represented by z is in the range of 0.1 to 99.9 mol %, the order of the repetition of noncycloolefin and cycloolefin is random, P is an integer in the range of 0 to 4, at least one of $R_1$, $R_2$, $R_3$, and $R_4$ is a radical of the following Formula 1a, the remains of $R_1$, $R_2$, $R_3$, and $R_4$ are each independently selected from the group consisting of hydrogen; halogen; substituted or unsubstituted C1-C20 alkyl; substituted or unsubstituted C2-C20 alkenyl; substituted or unsubstituted saturated or unsaturated C5-C12 cycloalkyl; substituted or unsubstituted C6-C40 aryl; substituted or unsubstituted C7-C15 aralkyl; substituted or unsubstituted C2-C20 alkynyl; and a non-hydrocarbonaceous polar group that comprises one or more elements selected from the group consisting of oxygen, nitrogen, phosphorus, sulfur, silicon, and boron, $R_1R_2$, $R_3$, and $R_4$ are optionally bonded to each other to form a C1-C10 alkylidene group, or $R_1$ or $R_2$ are optionally bonded to any one of $R_3$ and $R_4$ to form a saturated or unsaturated C4-C12 ring or an aromatic ring having 6 to 24 carbon atoms,

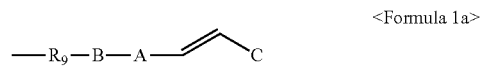

<Formula 1a> wherein A is substituted or unsubstituted C1-C20 alkylene, carbonyl, carboxy, substituted or unsubstituted C6-C40 arylene, or a single bond;

B is oxygen, sulfur, —NH—, or a single bond;

$R_9$ is a single bond, substituted or unsubstituted C1-C20 alkylene; substituted or unsubstituted C2-C20 alkenylene; substituted or unsubstituted C5-C12 cycloalkylene; substituted or unsubstituted C6-C40 arylene; substituted or unsubstituted C7-C15 aralkylene; or substituted or unsubstituted C2-C20 alkynylene;

C is C6-C40 aryl; or C6-C40 hetero aryl that comprises Group 14, 15 or 16 hetero elements, and the aryl or hetero aryl is substituted with substituted or unsubstituted C1-C20 alkoxy or substituted or unsubstituted C6-C30 aryloxy;

the non-hydrocarbonaceous polar group is —$OR_6$, —OC(O)$OR_6$, —$R_5OR_6$, —$R_5OC(O)OR_6$, —C(O)$OR_6$, —$R_5C(O)OR_6$, —C(O)$R_6$, —$R_5C(O)R_6$, —OC(O)$R_6$, —$R_5OC(O)R_6$, —$(R_5O)_p$—$OR_6$ (p is an integer in the range of 1 to 10), —$(OR_5)_p$—$OR_6$ (p is an integer in the range of 1 to 10), —C(O)—O—C(O)$R_6$, —$R_5C(O)$—O—C(O)$R_6$, —$SR_6$, —$R_5SR_6$, —$SSR_6$, —$R_5SSR_6$, —S(=O)$R_6$, —$R_5S(=O)R_6$, —$R_5C(=S)R_6$, —$R_6C(=S)SR_6$, —$R_5SO_3R_6$ —$SO_3R_6$, —$R_5N=C=S$, —N=C=S, —NCO, —$R_5$—NCO, —CN, —$R_5CN$, —NNC(=S)$R_6$, —$R_5NNC(=S)R_6$, —$NO_2$—$R_5NO_2$,

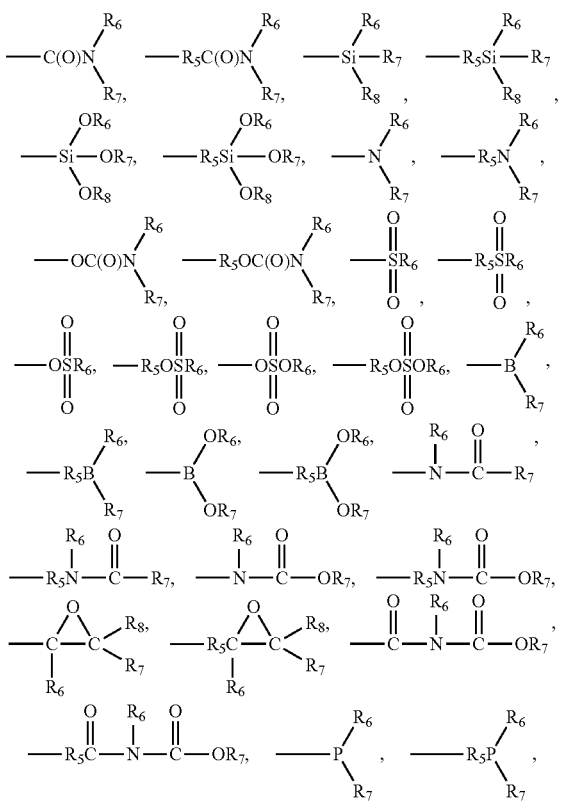

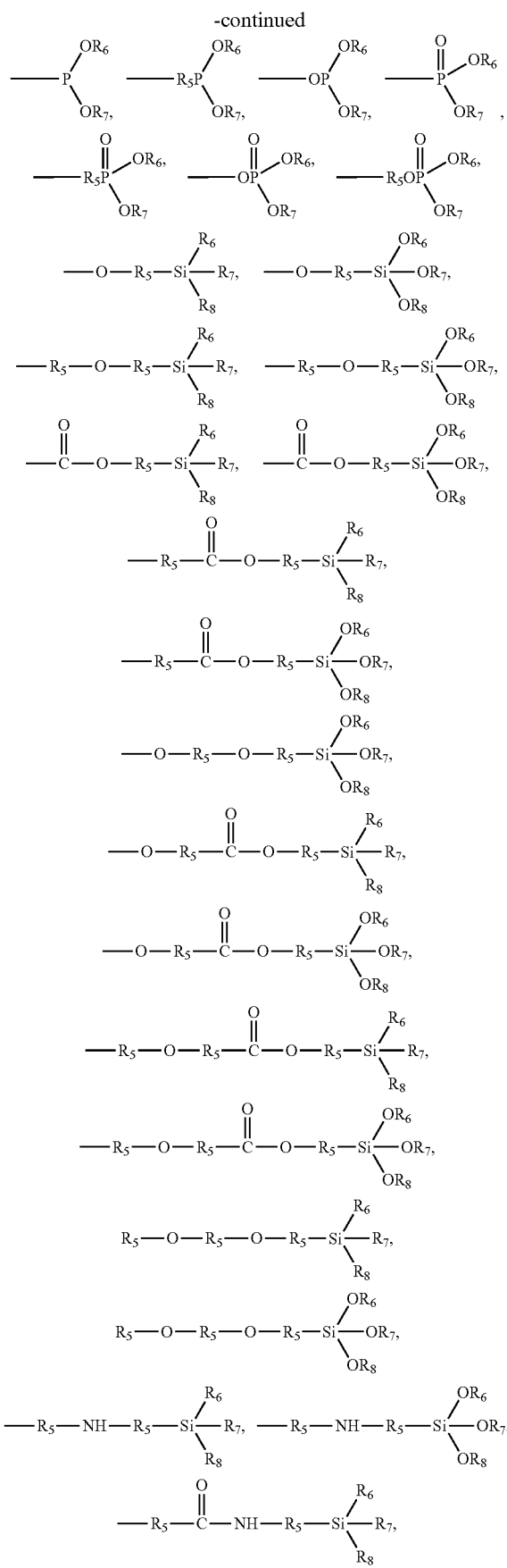
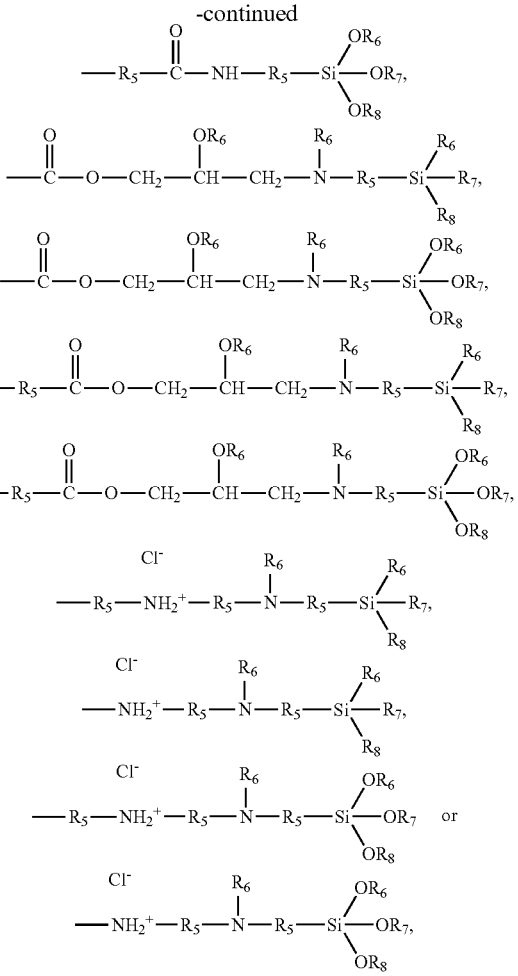

in the non-hydrocarbonaceous polar group, $R_5$ are optionally selected from the group consisting of substituted or unsubstituted C1-C20 alkylene; substituted or unsubstituted C2-C20 alkenylene; substituted or unsubstituted saturated or unsaturated (5-C12 cycloalkylene; substituted or unsubstituted C6-C40 arylene; substituted or unsubstituted C7-C15 aralkylene; and substituted or unsubstituted C2-C20 alkynylene, and $R_6$, $R_7$ and $R_8$ are each independently selected from the group consisting of hydrogen; halogen; substituted or unsubstituted C1-C20 alkyl; substituted or unsubstituted C2-C20 alkenyl; substituted or unsubstituted saturated or unsaturated C5-C12 cycloalkyl; substituted or unsubstituted C6-C40 aryl; substituted or unsubstituted C7-C15 aralkyl; and substituted or unsubstituted C2-C20 alkynyl; and Ra is a hydrogen atom or a C1-C20 hydrocarbon group, P' is an integer in the range of 0 to 4, $R'_1$, $R'_2$, $R'_3$, and $R'_4$ are each independently selected from the group consisting of hydrogen; halogen; substituted or unsubstituted C1-C20 alkyl, substituted or unsubstituted C2-C20 alkenyl; substituted or unsubstituted C5-C12 cycloalkyl;

substituted or unsubstituted C6-C40 aryl; substituted or unsubstituted C7-C15 aralkyl; substituted or unsubstituted C2-C20 alkynyl; and a non-hydrocarbonaceous polar group that comprises one or more elements selected from the group consisting of oxygen, nitrogen, phosphorus, sulfur, silicon, and boron, when R'$_1$, R'$_2$, R'$_3$, and R'$_4$ are not hydrogen, halogen, or a polar functional group, R'$_1$, and R'$_2$, or R'$_3$ and R'$_4$ are optionally bonded to each other to form a C1-C10 alkylidene group, or R'$_1$ or R'$_2$ are optionally bonded to any one of R'$_3$ and R'$_4$ to form a saturated or unsaturated C4-C12 ring or an aromatic ring having 6 to 24 carbon atoms, the non-hydrocarbonaceous polar group is —OR$_6$, —OC(O)OR$_6$, —R$_5$OR$_6$, —R$_5$OC(O)OR$_6$, —C(O)OR$_6$, —R$_5$C(O)OR$_6$, —C(O)R$_6$, —R$_5$C(O)R$_6$, —OC(O)R$_6$, —R$_5$OC(O)R$_6$, —(R$_5$O)$_p$—OR$_6$ (p is an integer in the range of 1 to 10), —(OR$_5$)$_p$—OR$_6$ (p is an integer in the range of 1 to 10), —C(O)—O—C(O)R$_6$, —R$_5$C(O)—O—C(O)R$_6$—, —SR$_6$, —R$_5$SR$_6$, —SSR$_6$, —R$_5$SSR$_6$, —S(=O)R$_6$, —R$_5$S(=O)R, —R$_5$C(=S)R$_6$, —R$_5$C(=S)SR$_6$, —R$_5$SO$_3$R$_6$, —SO$_3$R$_6$, —R$_5$N=C=S, —N=C=S, —NCO, —R$_5$—NCO, —CN, —R$_5$CN, —NNC(=S)R$_6$, —R$_5$NNC(=S)R$_6$, —NO$_2$, —R$_5$NO$_2$,

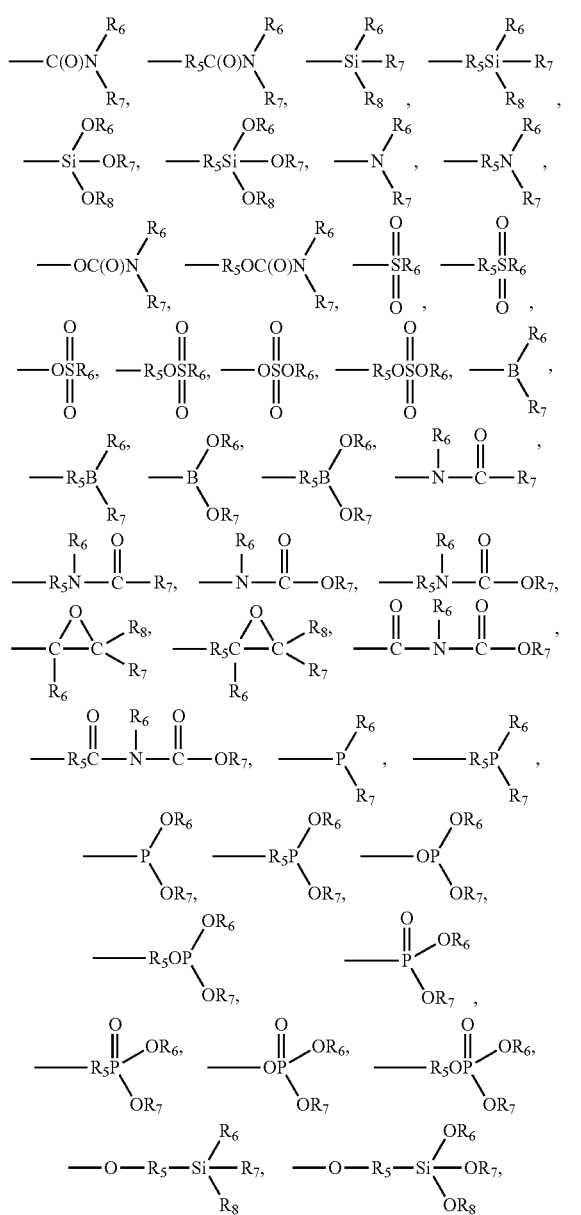

-continued

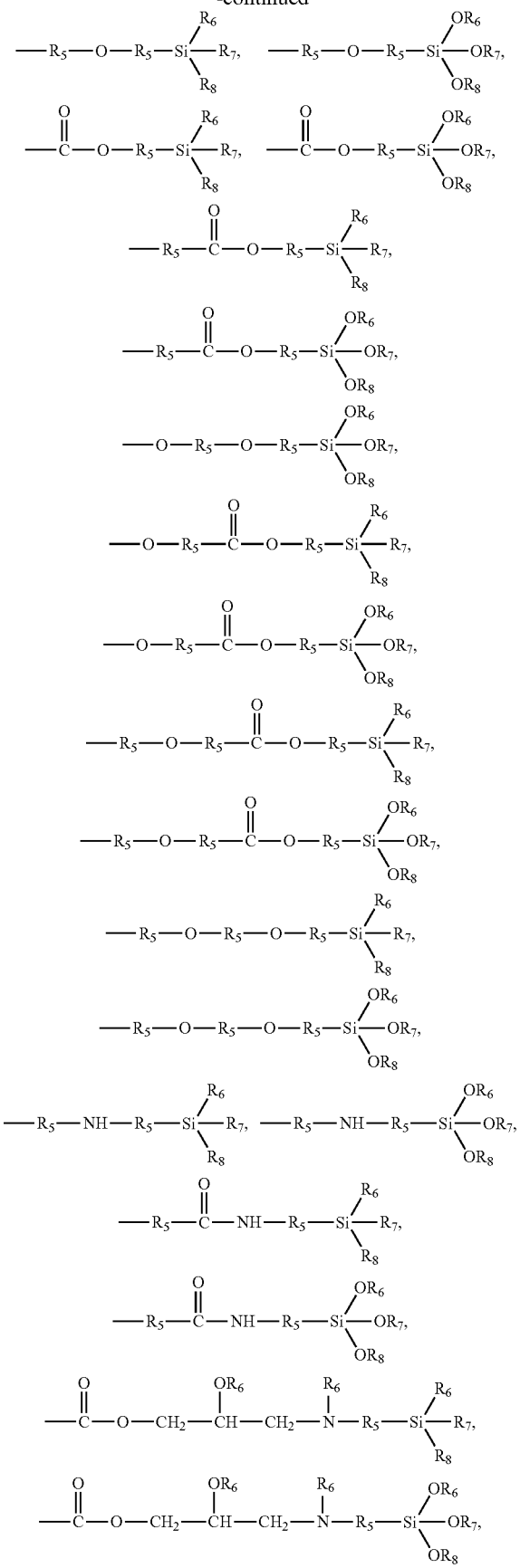

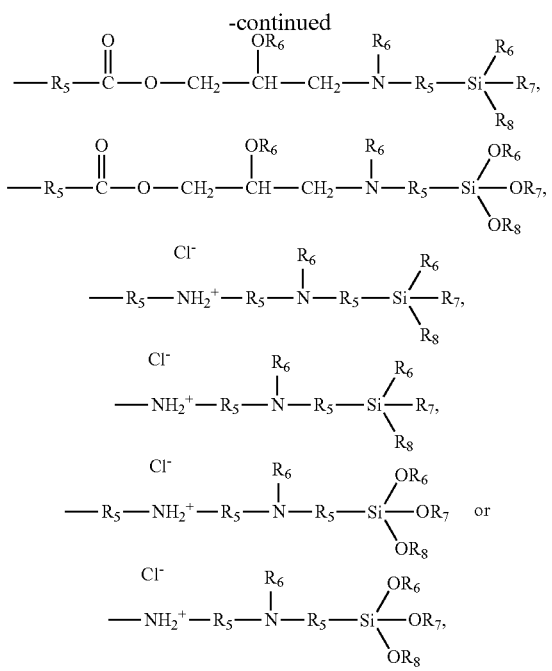

R$_5$ of each of the functional groups is substituted or unsubstituted C1-C20 alkylene; substituted or unsubstituted C2-C20 alkenylene; substituted or unsubstituted C5-C12 cycloalkylene; substituted or unsubstituted C6-C40 arylene; substituted or unsubstituted C7-C15 aralkylene; or substituted or unsubstituted C2-C20 alkynylene, and R$_6$, R$_7$ and R$_8$ are each hydrogen; halogen; substituted or unsubstituted C1-C20 alkyl; substituted or unsubstituted C2-C20 alkenyl; substituted or unsubstituted C5-C12 cyclo alkyl; substituted or unsubstituted C6-C40 aryl; substituted or unsubstituted C7-C15 aralkyl; or substituted or unsubstituted C2-C20 alkynyl.

13. The photoreactive polymer as set forth in claim 12, wherein in Formula 1a, C is any one selected from the group consisting of compounds represented by the following Formulae:

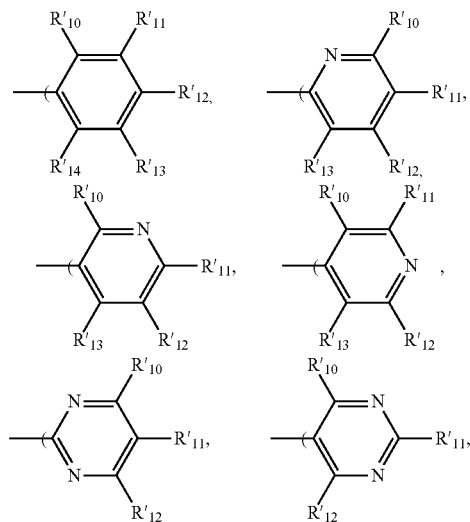

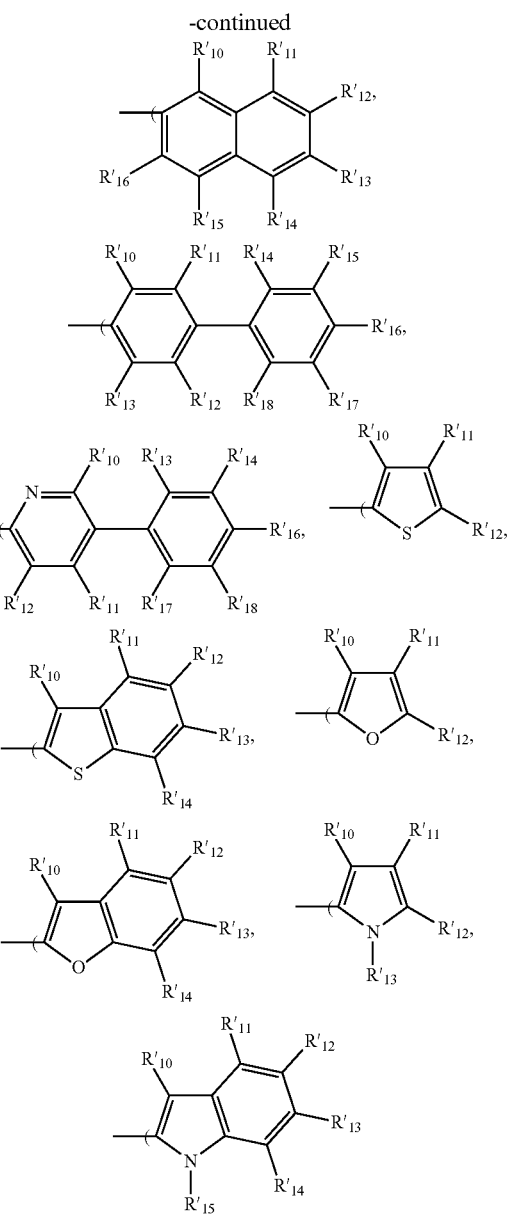

wherein at least one of R'$_{10}$, R'$_{11}$, R'$_{12}$, R'$_{13}$, R'$_{14}$, R'$_{15}$, R'$_{16}$, R'$_{17}$, and R'$_{18}$ is necessarily substituted or unsubstituted C1-C20 alkoxy or substituted or unsubstituted C6-C30 aryloxy, and the remains are each independently selected from the group consisting of hydrogen, substituted or unsubstituted C1-C20 alkyl, substituted or unsubstituted C1-C20 alkoxy, substituted or unsubstituted C6-C30 aryloxy, and substituted or unsubstituted C6-C40 aryl.

14. A method of preparing the photoreactive polymer of claim 12, the method comprising:

polymerizing a noncycloolefin monomer and a cycloolefin monomer that comprises a photoactive functional group in the presence of a catalyst mixture that consists of a procatalyst comprising a metallocene catalyst and a cocatalyst comprising aluminoxane at a temperature in the range of 10 to 200° C. under polymerization pressure in the range of 1 to 69 bar.

15. The method of preparing the photoreactive polymer as set forth in claim 14, wherein the catalyst mixture comprises $10^{-4}$, to $10^{-2}$ mole of the procatalyst based on 1 mole of the occatalyst.

16. The method of preparing the photoreactive polymer as set forth in claim 14, wherein the procatalyst is selected from the group consisting of rac-ethylene-bis-(1-indenyl)-zirconiumdichloride, isopropylene-(9-fluorenyl)-cyclopentadienyl-zirconiumdichloride, rac-dimethylsilyl-bis-(1-indenyl)-zirconium dichloride, phenylmethyl-(9-fluorenyl)-cyclopentadienyl zirconium dichloride, rac-dimethylgermyl-bis-(1-indenyl)-zirconium dichloride, rac-phenyl-methylsilyl-bis-(1-indenyl)-zirconium dichloride, and rac-phenylvinylsilyl-bis-(1-indenyl)-zirconium dichloride.

17. The method of preparing the photoreactive polymer as set forth in claim 14, wherein the aluminoxane is selected from the group consisting of methyl aluminoxane, ethyl aluminoxane, isobutyl aluminoxane, and butyl aluminoxane.

18. The method of preparing the photoreactive polymer as set forth in claim 14, wherein the transition metal compound (catalyst and occatalyst) is activated in a solution for 15 to 60 minutes and the temperature is previously set to a range of 15 to 70° C.

* * * * *